US006593970B1

(12) United States Patent
Serizawa et al.

(10) Patent No.: US 6,593,970 B1
(45) Date of Patent: Jul. 15, 2003

(54) IMAGING APPARATUS WITH DYNAMIC RANGE EXPANDED, A VIDEO CAMERA INCLUDING THE SAME, AND A METHOD OF GENERATING A DYNAMIC RANGE EXPANDED VIDEO SIGNAL

(75) Inventors: Masayuki Serizawa, Yokohama (JP); Kenji Tabei, Sagamihara (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/187,048

(22) Filed: Nov. 6, 1998

(30) Foreign Application Priority Data

Nov. 21, 1997 (JP) .............................. 9-336652
Nov. 21, 1997 (JP) .............................. 9-336653

(51) Int. Cl.$^7$ ................................. G03B 7/00
(52) U.S. Cl. ............... 348/362; 348/222.1; 348/229.1; 348/2
(58) Field of Search ............... 348/362, 222.1, 348/223.1, 224.1, 268, 229.1, 221.1

(56) References Cited

U.S. PATENT DOCUMENTS

| | | | | |
|---|---|---|---|---|
| 5,436,656 A | * | 7/1995 | Soga et al. | 348/221.1 |
| 5,517,242 A | | 5/1996 | Yamada et al. | |
| 5,801,773 A | * | 9/1998 | Ikeda | 348/362 |
| 5,877,810 A | * | 3/1999 | Inuiya et al. | 348/362 |
| 6,078,357 A | * | 6/2000 | Yamamoto et al. | 348/224.1 |
| 6,111,980 A | * | 8/2000 | Sano et al. | 348/223.1 |
| 6,160,581 A | * | 12/2000 | Higashihara et al. | 348/223.1 |
| 6,184,940 B1 | * | 2/2001 | Sano | 348/221.1 |
| 6,219,097 B1 | * | 4/2001 | Kamishima et al. | 348/362 |

FOREIGN PATENT DOCUMENTS

| | | |
|---|---|---|
| EP | 0 595 299 A | 5/1994 |
| JP | 63-209373 | 8/1988 |
| JP | 7-131718 | 5/1995 |

* cited by examiner

Primary Examiner—Wendy R. Garber
Assistant Examiner—Lin Ye
(74) Attorney, Agent, or Firm—Connolly Bove Lodge & Hutz LLP

(57) ABSTRACT

An imaging circuit generates a first video signal with a first exposure interval and a second video signal with a second exposure interval substantially at the same time, the second exposure interval being shorter than the first exposure interval, the first and second video signals respectively having first and second dynamic ranges which are different but continues. The first video signal is synchronized with the second video signal. An exposure ratio between the first and second exposure intervals is detected. A gain of the second video signal is adjusted according to the exposure ratio. A combined video signal is generated from the first and second video signals according to a mixing control signal indicative of a mixing ratio between first and second video signals and levels of the first and second video signals to have an expanded dynamic range such that the first dynamic range is connected to the second dynamic range with difference in gains of the first and second video signals adjusted for linearity. An edge enhancement signal may be gain-controlled or coring-controlled according to the mixing control signal or the exposure ratio. The similar apparatus and method for color signals are also disclosed. The output dynamic range for a display is limited by a non-linear process.

6 Claims, 16 Drawing Sheets

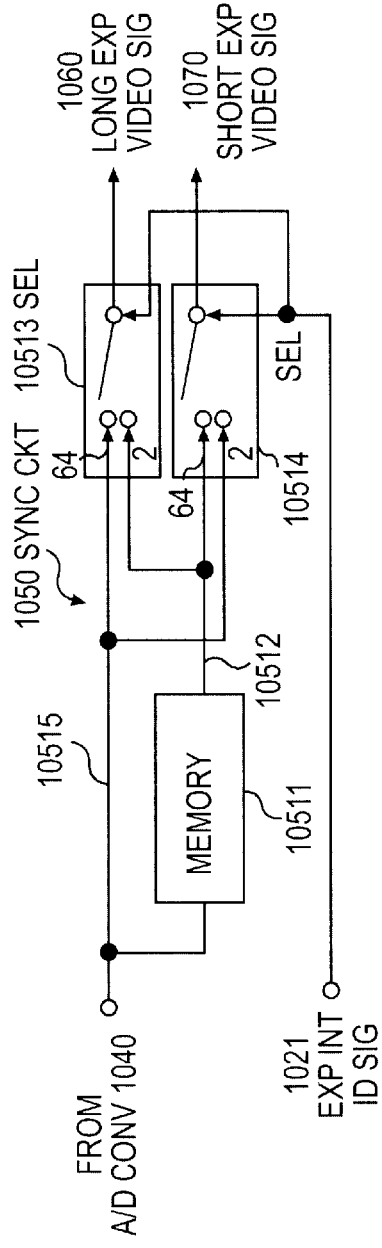
*FIG. 2*
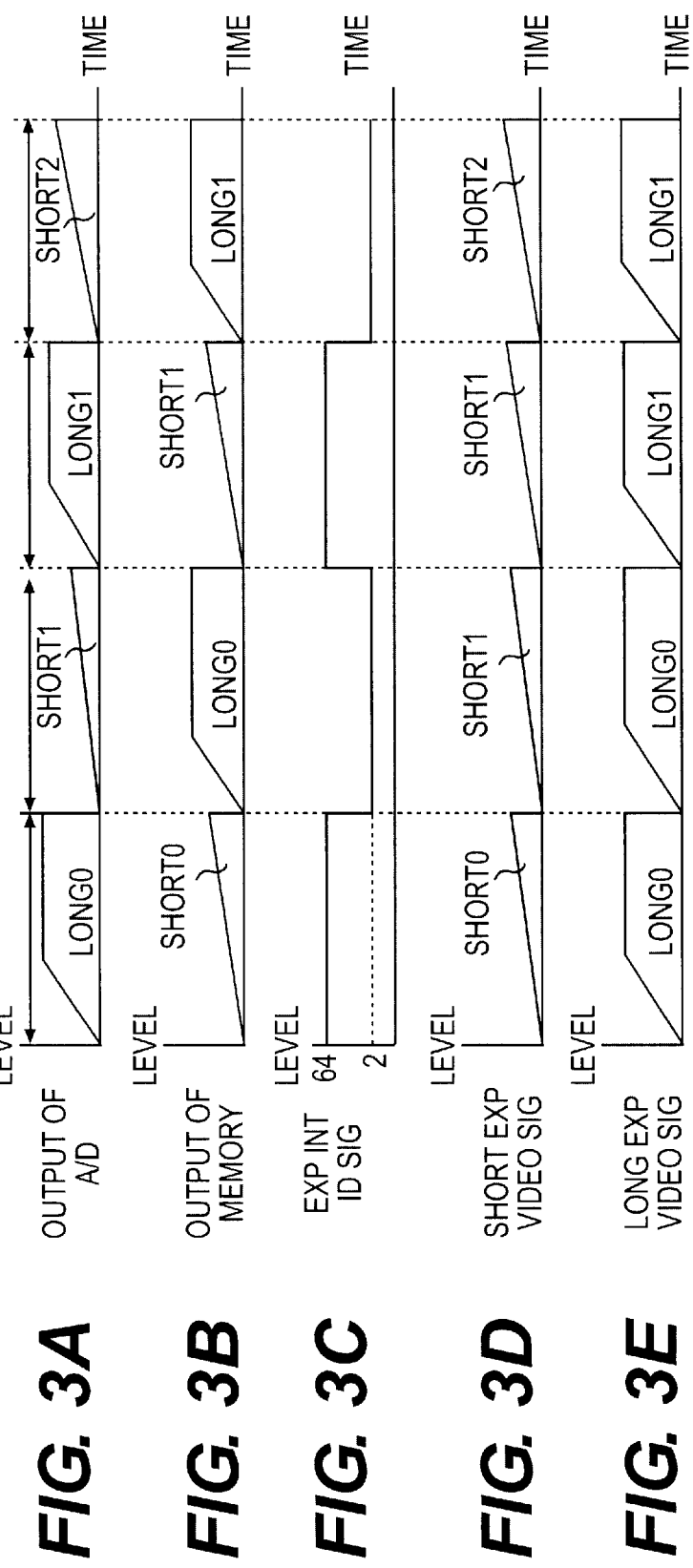
*FIG. 3A*
*FIG. 3B*
*FIG. 3C*
*FIG. 3D*
*FIG. 3E*

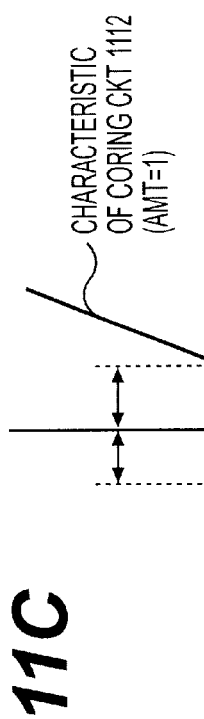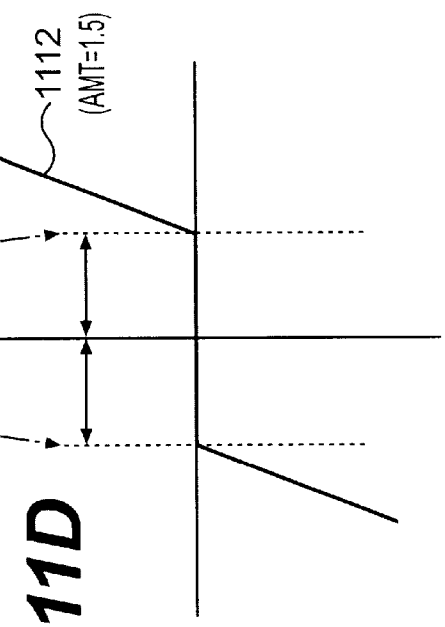
FIG. 11C
FIG. 11D
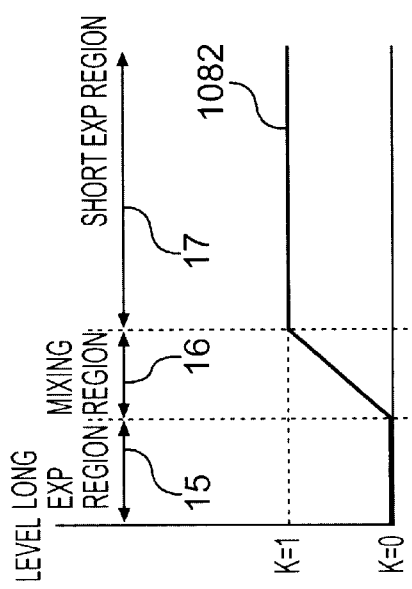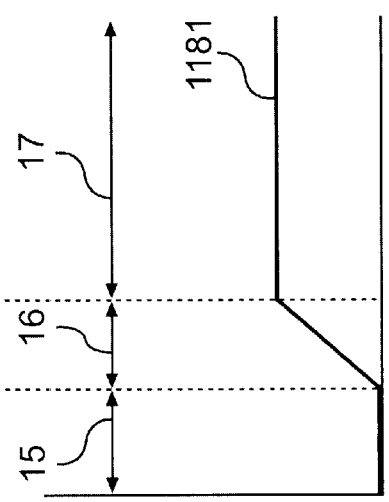
FIG. 11A
FIG. 11B

IMAGING APPARATUS WITH DYNAMIC RANGE EXPANDED, A VIDEO CAMERA INCLUDING THE SAME, AND A METHOD OF GENERATING A DYNAMIC RANGE EXPANDED VIDEO SIGNAL

BACKGROUND OF THE INVENTION

1. Field of the Invention

This invention relates to an imaging apparatus with its dynamic range expanded, a video camera including the same, and a method of generating a dynamic range expanded video signal.

2. Description of the Prior Art

An imaging apparatus for generating a dynamic range expanded video signal by combining video signals generated substantially at the same time with different exposure intervals is known. Such an image apparatus is disclosed in Japanese patent application provisional publication No. 07131718A. A video signal processing circuit including an edge enhancement signal generation circuit generating an edge enhancement signal from a video signal and a gamma correction circuit for compensating a gamma of the video signal, wherein the edge enhancement signal is not subjected the gamma correction and is added to the gamma-corrected video signal is known. Such a video signal processing circuit is disclosed in Japanese patent application provisional publication No. 63-209373.

SUMMARY OF THE INVENTION

The aim of the present invention is to provide a superior imaging apparatus with dynamic range expanded, a superior video camera including the same, and a superior method of generating a dynamic range expanded video signal.

According to the present invention, a first imaging apparatus is provided, which comprises: an imager including driving circuit for receiving an optical image and generating a first video signal with a first exposure interval and a second video signal with a second exposure interval substantially at the same time, the second exposure interval being shorter than the first exposure interval, the first and second video signals respectively having first and second effective detection ranges which are different but continuous; a synchronizing circuit for synchronizing the first video signal with the second video signal every corresponding frames of the first and second video signals; an exposure interval ratio detection circuit responsive to the driving circuit for detecting an exposure ratio between the first and second exposure intervals; a gain adjusting circuit responsive to the first and second video signals from the synchronizing circuit for adjusting a difference between gains of the first and second video signals from the synchronizing circuit in accordance with the exposure ratio from the exposure interval ratio detection circuit for linearity; a mixing control signal generation circuit for generating a mixing control signal indicative of a mixing ratio of the first and second video signals in accordance with the first and second video signals from the gain adjusting circuit; and a combining circuit for generating and outputting a combined video signal from the first and second video signals from the gain adjusting circuit in accordance with the mixing control signal and levels of the first and second video signals to have an expanded detection range such that the first effective detection range is connected to the second effective detection range.

In the first imaging apparatus, the gain adjusting circuit adjusts the difference between gains of the first and second video signals from the synchronizing circuit to provide a linearity in the expanded detection range.

The first imaging apparatus may further comprise: an edge enhancement signal generation circuit for generating an edge enhancement signal from the combined video signal; an edge enhancement amount control circuit for controlling an amount of the edge enhancement signal in accordance with the mixing control signal; and an adding circuit for adding the edge enhancement signal from the gain adjusting circuit and the combined video signal and outputting an edge-enhanced video signal. In this case, the edge enhancement amount control circuit controls the amount of the edge enhancement signal in accordance with the exposure ratio in addition to the mixing control signal.

The first imaging apparatus may further comprise: an edge enhancement signal generation circuit for generating an edge enhancement signal from the combined video signal; a coring amount control signal generation circuit for generating a coring amount control signal in accordance with the mixing control signal; and a coring circuit for effecting a coring operation to the edge enhanced signal in accordance with the coring amount control signal from the coring amount control signal generation circuit; and an adding circuit for adding the edge enhancement signal from the edge enhancement signal generation circuit and the combined video signal and outputting an edge-enhanced video signal. In this case, the coring amount control signal generation circuit generates the coring amount control signal in accordance with the exposure ratio in addition to the mixing control signal.

According to the present invention, a first method of generating a combined video signal from an optical image is provided which comprises the steps of: receiving the optical image and generating a first video signal with a first exposure interval and a second video signal with a second exposure interval substantially at the same time, the second exposure interval being shorter than the first exposure interval, the first and second video signals respectively having first and second effective detection ranges which are different but continuous; synchronizing the first video signal with the second video signal every corresponding frames of the first and second video signals; detecting an exposure ratio between the first and second exposure intervals; adjusting a difference in gains of the synchronized first and second video signal in accordance with the exposure ratio; generating a mixing control signal indicative of a mixing ratio of the first and second video signals in accordance with the gain-adjusted first and second video signals; and generating and outputting the combined video signal from the gain-adjusted first and second video signals in accordance with the mixing control signal and levels of the gain-adjusted first and second video signals to have an expanded dynamic range such that the first effective detection range is connected to the second effective detection range.

According to the present invention, a second imaging apparatus is provided which comprises: an imager including a driving circuit for receiving an optical image and generating a first video signal with a first exposure interval and a second video signal with a second exposure interval substantially at the same time, the second exposure interval being shorter than the first exposure interval, the first and second video signals respectively having first and second dynamic ranges which are different but continuous; a synchronizing circuit for synchronizing the first video signal with the second video signal every corresponding frames of the first and second video signals; a mixing control signal generation circuit for generating a mixing control signal indicative of a mixing ratio of the first and second video signals; a video signal generation circuit for generating a combined video signal from the first and second video signals from the synchronizing circuit in accordance with the mixing control signal and levels of the first and second video signals to have an expanded dynamic range such that the first effective detection range is connected to the second effective detection range; an edge enhancement signal generation circuit for generating an edge enhancement signal from the combined video signal; an edge enhancement amount control circuit responsive to the driving circuit for controlling an amount of the edge enhancement signal in accordance with the mixing control signal; and an adding circuit for adding the edge enhancement signal from the gain adjusting circuit and the combined video signal and outputting an edge-enhanced video signal.

The second imaging apparatus may further comprise a generation circuit generating a coring amount control signal in accordance with the mixing control signal and a coring circuit for effecting a coring operation to the edge enhancement signal in accordance with the coring amount control signal.

According to the present invention, a second method of generating a combined video signal from an optical image is provided which comprises the steps of: receiving the optical image and generating a first video signal with a first exposure interval and a second video signal with a second exposure interval substantially at the same time, the second exposure interval being shorter than the first exposure interval, the first and second video signals respectively having first and second effective detection ranges which are different but continuous; synchronizing the first video signal with the second video signal every corresponding frames of the first and second video signals; generating a mixing control signal indicative of a mixing ratio of the first and second video signals in accordance with the gain-adjusted first and second video signals; generating the combined video signal from the synchronized first and second video signal in accordance with the mixing control signal and levels of the first and second video signals to have an expanded detection range such that the first effective detection range is connected to the second effective detection range; generating an edge enhancement signal from the combined video signal; controlling an amount of the edge enhancement signal in accordance with the mixing control signal; and adding the gain-adjusted edge enhancement signal and the combined video signal and outputting an edge-enhanced video signal.

The second method may further comprise the steps of: generating a coring amount control signal in accordance with the mixing control signal; and effecting a coring operation to the edge enhancement signal in accordance with the coring amount control signal.

According to the present invention, a third imaging apparatus is provided which comprises: an imager including driving circuit for receiving an optical image and generating a first video signal with a first exposure interval and a second video signal with a second exposure interval substantially at the same time, the second exposure interval being shorter than the first exposure interval, the first and second video signals respectively having first and second effective detection ranges which are different but continuous; a synchronizing circuit for synchronizing the first video signal with the second video signal every corresponding frames of the first and second video signals; an exposure ratio detection circuit responsive to the driving circuit for detecting an exposure ratio between the first and second exposure intervals; a mixing control signal generation circuit for generating a mixing control signal indicative of a mixing ratio of the first and second video signals in accordance with the first and second video signals from the synchronizing circuit; a combining circuit for generating a combined video signal from the first and second video signals from the synchronizing circuit in accordance with the mixing control signal and levels of the first and second video signals to have an expanded dynamic range such that the first effective detection range is connected to the second effective detection range; an edge enhancement signal generation circuit for generating an edge enhancement signal from the combined video signal; an edge enhancement amount control circuit for controlling an amount of the edge enhancement control signal in accordance with the mixing control signal and the exposure interval ratio; and an adding circuit for adding the edge enhancement signal from the gain adjusting circuit and the combined video signal and outputting an edge-enhanced video signal.

The third imaging apparatus may further comprise: a coring amount control signal generation circuit for generating a coring amount control signal in accordance with the mixing control signal and the exposure ratio; and a coring circuit for effecting a coring operation to the edge enhanced signal in accordance with the coring amount control signal from the coring amount control signal generation circuit.

According to the present invention, a third method of generating a combined video signal from an optical image is provided which comprises the steps of: receiving the optical image and generating a first video signal with a first exposure interval and a second video signal with a second exposure interval substantially at the same time, the second exposure interval being shorter than the first exposure interval, the first and second video signals respectively having first and second effective detection ranges which are different but continuous; synchronizing the first video signal with the second video signal; detecting an exposure ratio between the first and second exposure intervals; generating a mixing control signal indicative of a mixing ratio of the synchronized first and second video signals in accordance with the synchronized first and second video signals; generating the combined video signal from the synchronized first and second video signals in accordance with the mixing control signal and levels of the first and second video signals to have an expanded detection range such that the first effective detection range is connected to the second effective detection range; generating an edge enhancement signal from the combined video signal; controlling an amount of the edge enhancement signal in accordance with the mixing control signal and the exposure interval; and adding the gain-adjusted enhancement signal from the gain adjusting circuit and the combined video signal and outputting an edge-enhanced video signal.

The third method may further comprise the steps of: generating a coring amount control signal in accordance with the mixing control signal and the exposure ratio; and effecting a coring operation to the edge enhancement signal in accordance with the coring amount control signal.

According to the present invention, a fourth imaging apparatus is provided which comprises: an imager including driving circuit for receiving separated red, green, and blue optical images and generating first red, first green, and first blue video signals with a first exposure interval and second red, second green, and second blue video signals with a second exposure interval substantially at the same time, the second exposure interval being shorter than the first exposure interval, the first red, green, and blue video signals respectively having first red, first green, and first blue effective detection ranges which are different from the second red, second green, and blue but continuous; a synchronizing circuit for synchronizing the first red, first green, and first blue video signals with second red, second green, and second blue video signals every corresponding frames of the first red, first green, and first blue video signals and the second red, second green, and second blue video signals, respectively; an exposure interval ratio detection circuit responsive to the driving circuit for detecting an exposure ratio between the first and second exposure intervals; a gain adjusting circuit for respectively adjusting difference between gains of the first red, first green, and first blue video signals and second red, first, and video signals from the synchronizing circuit in accordance with the exposure ratio from the exposure interval ratio detection circuit; a mixing control signal generation circuit for generating red, green, and blue mixing control signals respectively indicating mixing ratios between the first red, first green, and first blue video signals and second red, second green, and second blue video signals in accordance with the first red, first green, and first blue video signals and second red, second green, and second blue video signals; and a combining circuit for generating and outputting combined red, green, and blue video signals from the first red, first green, and first blue video signals and second red, second green, and second blue video signals from the gain adjusting circuit in accordance with the red, green, and blue mixing control signals and levels of the first red, first green, and first blue video signals and second red, second green, and second blue video signals to have expanded red, green, and blue detection ranges such that the first red, first green, and first blue effective detection ranges are connected to the second red, second green, and second blue video signals, respectively.

The fourth imaging apparatus may further comprise: a maximum detection circuit for detecting a maximum level among the combined red, combined green, and combined blue video signals for one frame period; and a non-linear processing circuit responsive to display dynamic range data for generating and outputting red, green, and blue display signals respectively having non-linear characteristics such that the maximum level is made equal to or less than the display dynamic range data when the detected maximum level is larger than the display dynamic range data and outputting the combined red, green, and blue video signal as they are when the detected maximum level is not larger than the display dynamic range data.

According to the present invention, a fourth method of generating a combined video signal from an optical image is provided which comprises the steps of: receiving separated red, green, and blue optical images; generating first red, first green, and first blue video signals with a first exposure interval and second red, second green, and second blue video signals with a second exposure interval substantially at the same time, the second exposure interval being shorter than the first exposure interval, the first red, first,green, and first blue video signals respectively having first red, first green, and first blue effective detection ranges and the second red, second green, and second blue video signals respectively having second red, second green, and second blue effective detection ranges which are different from the first red, first green, and first blue effective detection ranges but continuous; synchronizing the first red, first green, and first blue video signals with second red, second green, and second blue video signals every corresponding frames of the first red, first green, and first blue video signals and the second red, second green, and second blue video signals, respectively; detecting an exposure ratio between the first and second exposure intervals; adjusting difference between gains of the first red, first green, and first blue video signals and second red, second green, and second blue video signals from the synchronizing circuit in accordance with the exposure ratio; generating red, green, and blue mixing control signals respectively indicating mixing ratios between the first red, first green, and first blue video signals and second red, second green, and second blue video signals; and generating and outputting combined red, green, and blue video signals from the first red, first green, and first blue video signals and second red, second green, and second blue video signals from the gain adjusting circuit in accordance with the red, green, and blue mixing control signals and levels of the first red, first green, and first blue video signals and second red, second green, and second blue video signals to have expanded red, green, and blue detection ranges such that the first red, first green, and first blue effective detection ranges are connected to the second red, second green, and second blue video signals, respectively.

The fourth method may further comprise the steps of: detecting a maximum level among the combined red, combined green, and combined blue video signals for one frame period; and generating and outputting red, green, and blue display signals having non-linear characteristics in accordance with display dynamic data and the maximum level such that the maximum level is made equal to or less than the display dynamic range data when the detected maximum level is larger than the display dynamic range data and outputting the combined red, green, and blue video signal as they are when the detected maximum level is not larger than the display dynamic range data.

According to the present invention, a video camera is provided which comprises: a lens unit; separation unit for separating an optical image beam into separated red, green, and blue optical images; an imaging unit including driving circuit for receiving separated red, green, and blue optical images and generating first red, first green, and first blue video signals with a first exposure interval and second red, second green, and second blue video signals with a second exposure interval substantially at the same time, the second exposure interval being shorter than the first exposure interval, the first red, first green, and first blue video signals respectively having first red, first green, and first blue effective detection ranges, the second red, second green, and second blue video signals respectively having second red, second green, and second blue effective detection ranges which are different from first red, first green, and first blue effective detection ranges respectively but continuous; a synchronizing circuit for synchronizing the first red, first green, and first blue video signals with second red, second green, and second blue video signals every corresponding frames of the first red, first green, and first blue video signals and the second red, second green, and second blue video signals, respectively; an exposure interval ratio detection circuit responsive to the driving circuit for detecting an exposure ratio between the first and second exposure intervals; a gain adjusting circuit for respectively adjusting difference between gains of the first red, first green, and first blue video signals and second red, first, and video signals from the synchronizing circuit in accordance with the exposure ratio from the exposure interval ratio detection circuit; a mixing control signal generation circuit for generating red, green, and blue mixing control signals respectively indicating mixing ratios between the first red, first green, and first blue video signals and second red, second green, and second blue video signals; and a combining circuit for generating and outputting combined red, green, and blue video signals from the first red, first green, and first blue video signals and second red, second green, and second blue video signals from the gain adjusting circuit in accordance with the red, green and blue mixing control signals and levels of the first red, first green, and first blue video signals and second red, second green, and second blue video signals to have expanded red, green, and blue detection ranges such that the first red, first green, and first blue effective detection ranges are connected to the second red, second green, and second blue video signals, respectively.

The camera may further comprise: a maximum detection circuit for detecting a maximum level among the combined red, combined green, and combined blue video signals for one frame period; and a non-linear processing circuit responsive to display dynamic range data for generating and outputting red, green, and blue display signals having non-linear characteristics such that the maximum level is made equal to or less than the display dynamic range data when the detected maximum level is larger than the display dynamic range data and outputting the combined red, green, and blue video signal as they are when the detected maximum level is not larger than the display dynamic range data.

BRIEF DESCRIPTION OF THE DRAWINGS

The object and features of the present invention will become more readily apparent from the following detailed description taken in conjunction with the accompanying drawings in which:

FIG. 2 is a block diagram of the first embodiment showing the structure of the synchronizing circuit shown in FIG. 1;

FIGS. 3A to 3E are timing charts of the first embodiment for illustrating the synchronizing operation;

FIGS. 11A to 11D are graphical drawings of the third embodiment;

The same or corresponding elements or parts are designated with like references throughout the drawings.

DETAILED DESCRIPTION OF THE INVENTION

FIRST EMBODIMENT

Figure 1:
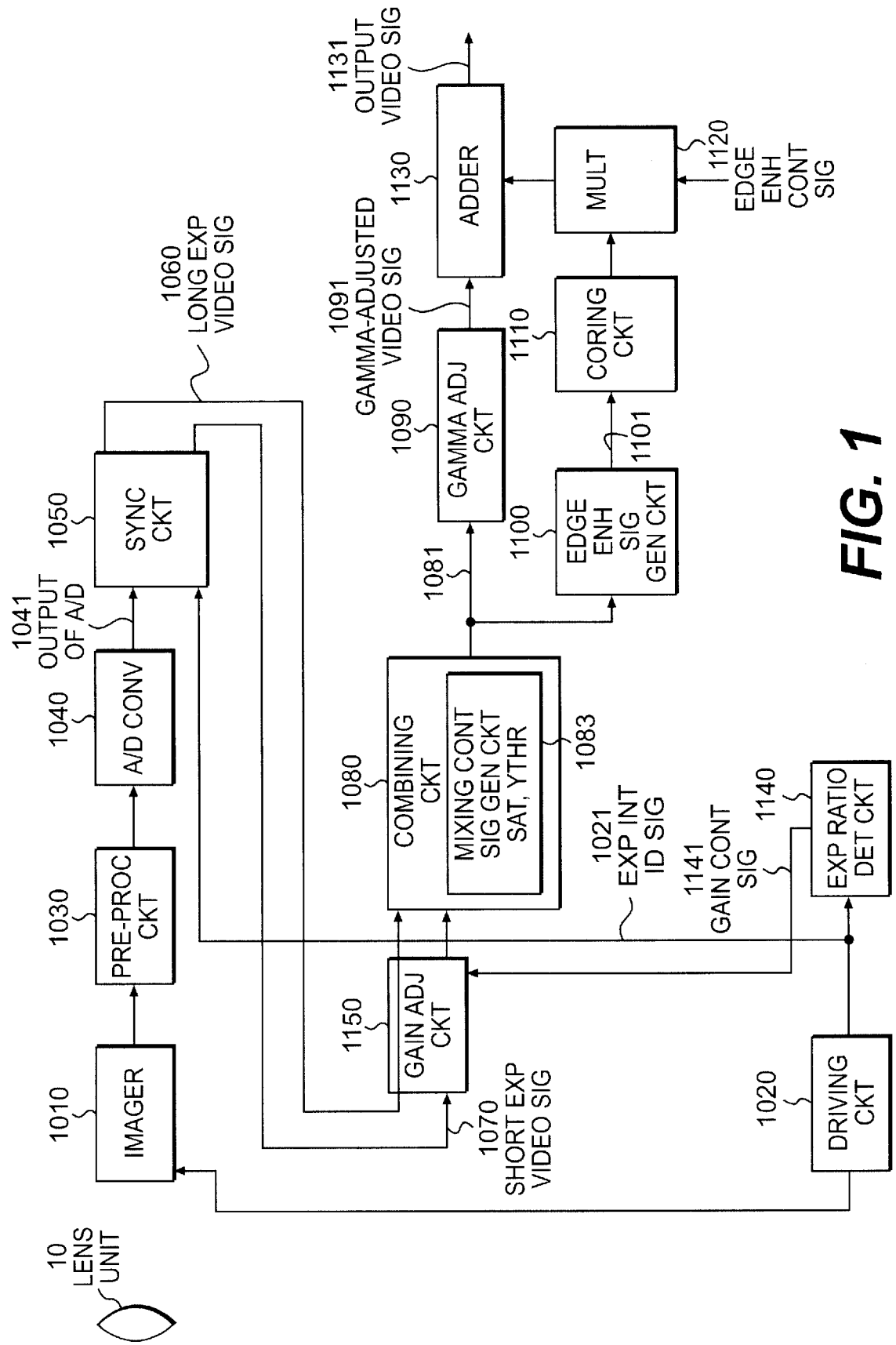
FIG. 1 is a block diagram of an imaging apparatus of a first embodiment.

FIG. 1 is a block diagram of an imaging apparatus of a first embodiment. An imager 1010 receives an optical image thereon through a lens unit 10 and alternatively generating a long exposure video signal with a first exposure interval and a short interval exposed video signal with a second exposure interval substantially at the same time (at slightly different timings, i.e., consecutive two frames) under control by a driving circuit 1020. The second exposure interval is shorter than the first exposure interval. The long exposure video signal and the short exposure video signal respectively have first and second effective detection ranges 11 and 12. A pre-processing circuit 1030 effects pre-processing the long exposure video signal and short exposure video signal. The pre-processing circuit 1030 includes a CDS circuit (not shown) for cancelling noise components in the analog long exposure video signal and the analog short exposure video signal from the imager 1010 by correlation double sampling, an automatic gain controlled amplifier (not shown) for amplifying the long exposure video signal and the short exposure video signal from the CDS circuit with the gain automatically controlled, a clamp circuit for clamping the output of the automatic gain controlled amplifier for inputting it to the following a/d converter 1040. The a/d converter 1040 a/d-converts the long exposure video signal and the short exposure video signal into a digital long exposure video signal and a digital short exposure video signal. The output 1041 of the a/d converter 1040 is supplied to a synchronizing circuit 1050.

The synchronizing circuit 1050 synchronizes the digital long exposure video signal with the digital short exposure video signal and outputs the digital long exposure video signal and the digital short exposure video signal in parallel at the same time with the slight time different adjusted.

An exposure ratio detection circuit 1140 responsive to the driving circuit 1020 detects an exposure ratio between the first and second exposure intervals and outputs a gain control signal 1141. A gain adjusting circuit 1150 adjusts a difference between gains of the first and second video signals from the synchronizing circuit 1050 in accordance with the exposure ratio in the gain control signal 1141 from the exposure ratio detection circuit 1140, that is, a gain of the short exposure video signal from the synchronizing circuit 1050 is adjusted.

Figure 7A:
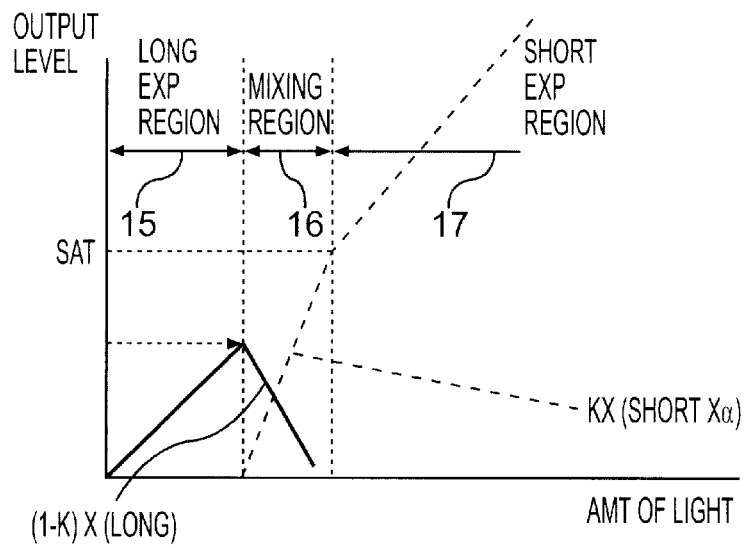
FIGS. 7A to 7C are graphical drawings of the first embodiment showing another example of the gain-adjusting and combining operations.
Figure 7B:
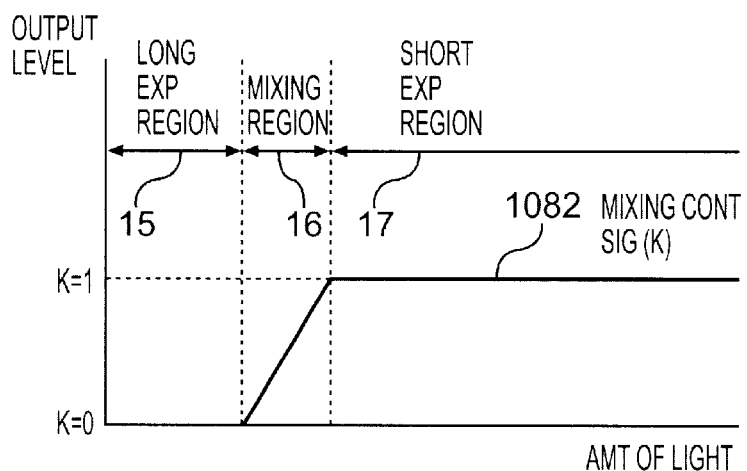

A video signal combining circuit 1080 includes a mixing control signal generation circuit 1083 for generating a mixing control signal indicative of a mixing ratio k between the long exposure video signal and the short exposure video signals and combines the long exposure signal from the synchronizing circuit 1050 with the short exposure video signal from the gain adjusting circuit 1150 in accordance with the mixing control signal 1082 shown in FIG. 7B and levels of the long exposure video signal and the gain adjusted short exposure video signal to have an expanded detection range such that the first effective detection range 11 is connected to the second effective detection range 12.

The combined video signal 1080 shows a linearity because the gain of the short exposure video signal 1070 is adjusted.

The combined video signal 1081 is supplied to a gamma adjusting circuit 1090 and to an edge enhancement signal generation circuit 1100. The gamma adjusting circuit 1090 adjusts the gamma of the combined video signal 1081. The edge enhancement signal generation circuit 1100 generates an edge enhancement signal from the combined video signal 1081 and supplies the edge enhancement signal to a coring circuit 1110. The coring circuit 1110 removes noise components of which levels less than a predetermined level and supplies the edge enhancement signal to a multiplexer 1120. The multiplexer 1120 multiply the edge enhancement signal with an edge enhancement control signal and supplies the edge enhancement signal to an adder 1130. The adder 1130 adds the edge enhancement signal from the multiplexer 1120 to the gamma-adjusted video signal 1091 to generate an output video signal 1131. The lens unit 10 is further provided to the imaging apparatus to provide a video camera.

FIG. 2 is a block diagram of the first embodiment showing the structure of the synchronizing circuit shown in FIG. 1. The synchronizing circuit 1050 includes a memory for storing the output of the a/d converter 1041, a selector 10513 for outputting either of the output 1041 of the a/d converter or the output 10512 of the memory 10511 in accordance with an exposure interval identification signal 1021 from the driving circuit 1020 to selectively output the long exposure video signal 1060, and a selector 10514 for outputting either of the output 1041 of the a/d converter or the output 10512 of the memory 10511 in accordance with the exposure interval identification signal 1021 from the driving circuit 1020 to selectively output the short exposure video signal 1060.

FIGS. 3A to 3E are timing charts of the first embodiment for illustrating the synchronizing operation by the synchronizing circuit 1050.

The imager 1010 alternately outputs the long exposure video signal and the short exposure video signal as shown in FIG. 3A as the output 1041 of the a/d converter 1040. The memory 10511 outputs the output 1041 of the a/d converter 1040 with one frame delay. Therefore, one frame of the short exposure video signal on the line 10515 is synchronized with the corresponding frame of the long exposure video signal from the memory 10511. For the next frame interval, the long exposure video signal on the line 10515 is synchronized with the corresponding frame of the short exposure video signal from the memory 10511. This operation is repeated as shown in FIGS. 3A and 3B. The exposure interval identification signal 1021 changes its output level between "2" and "64" every frame (field) as shown in FIG. 3C. The selector 10513 performs the switching operation to only output the long exposure video signal 1060 continuously as shown in FIG. 3E. The selector 10514 performs the switching operation to only output the short exposure video signal 1070 continuously, as shown in FIG. 3D. A frame of the short exposure video signal from the selector 10514 is synchronous with the corresponding frame of the long exposure video signal 1060 from the selector 10513 as shown in FIGS. 3D and 3E.

Figure 4:
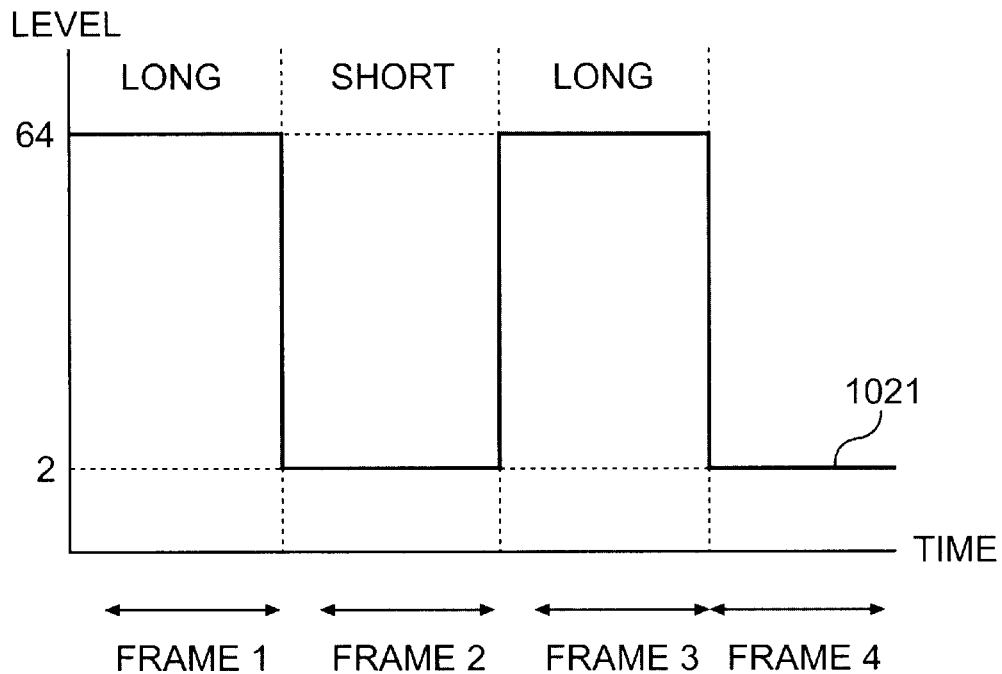
FIG. 4 is a time chart of the first embodiment showing the exposure interval identification signal shown in FIG. 1.

FIG. 4 is a time chart of the first embodiment showing the exposure interval identification signal 1021. The driving circuit 1020 generates the exposure interval identification signal 1021 alternately showing a high level value of "64" for the long exposure interval and a low level value of "2" for the short exposure interval as shown in FIG. 4.

Figure 5:
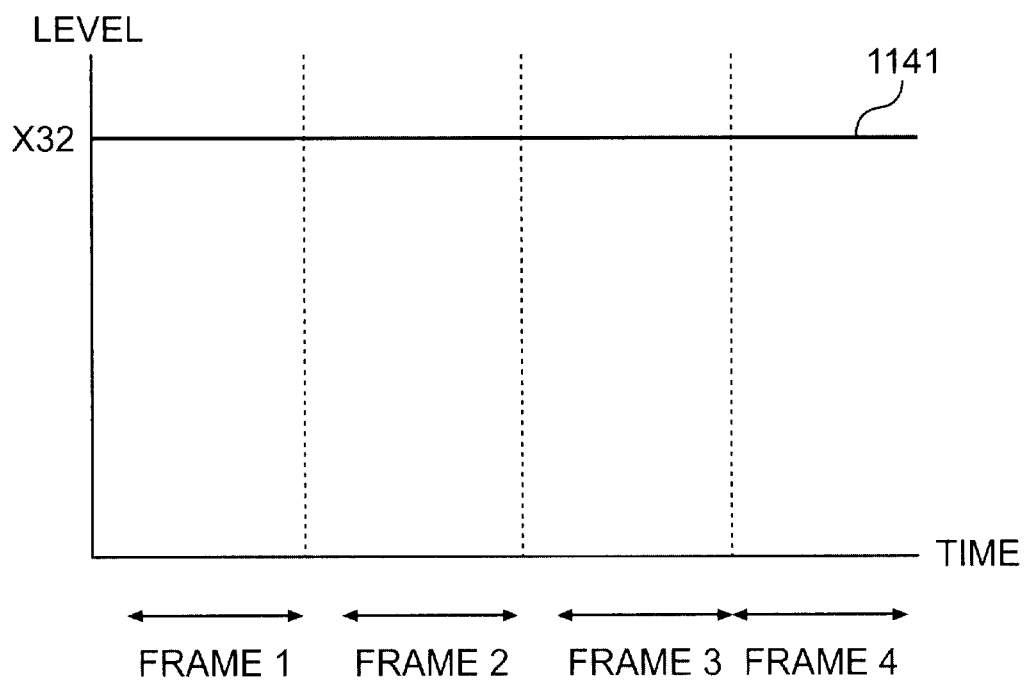
FIG. 5 is a time chart of the first embodiment showing the gain control signal shown in FIG. 1.

FIG. 5 is a time chart of the first embodiment showing the gain control signal 1141. The exposure ratio detection circuit 1140 detects the exposure ratio of "32" from the high level value of "64" for the long exposure interval (frame) and the low level value of "2" for short exposure interval (frame) as shown in FIG. 5.

Figure 6A:
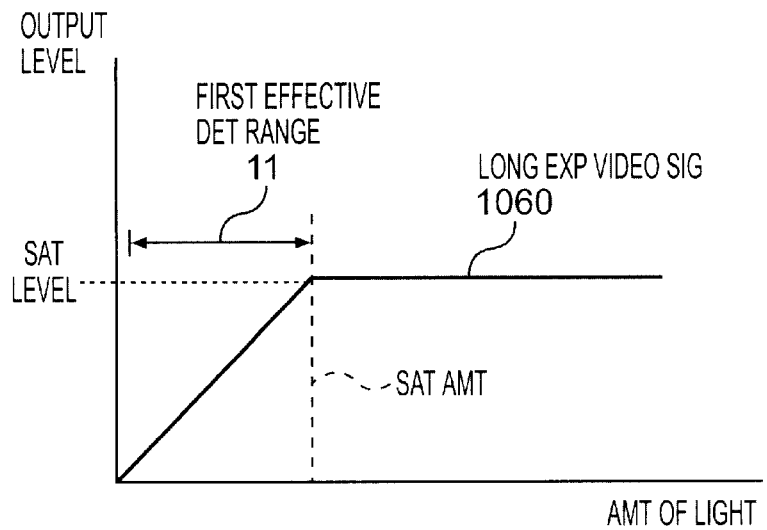
FIGS. 6A to 6C are graphical drawings of the first embodiment showing the gain-adjusting and combining operations.
Figure 6B:
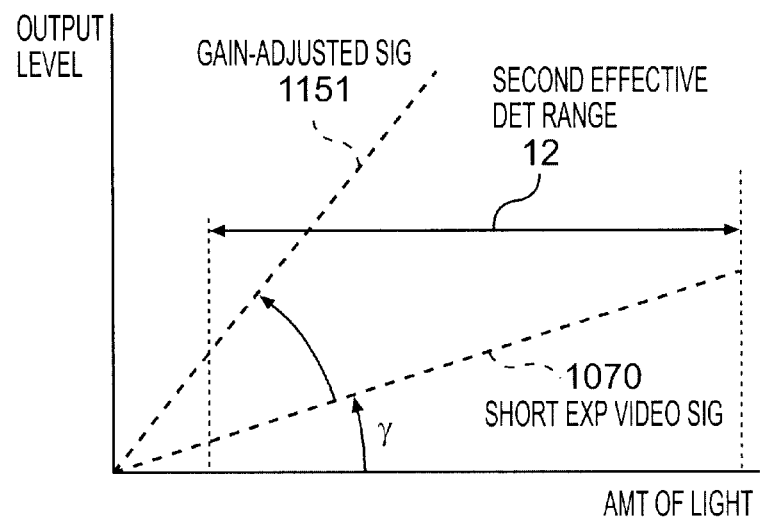
Figure 6C:
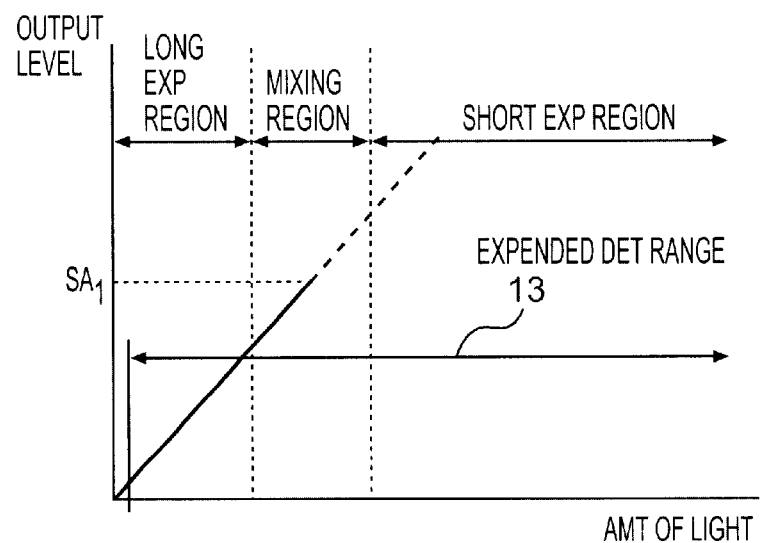

FIGS. 6A to 6C are graphical drawings of the first embodiment showing the gain-adjusting and combining operations.

As shown in FIG. 6A, a level of the long exposure video signal 1060 increases with the amount of received light up to a saturation level (SAT) at a saturation amount. After (larger) the saturation amount the level of the long exposure video signal 1060 is constant. The long exposure video signal saturates with a relatively low amount of light because the exposure interval is relatively long. On the other hand, at the dark level range, the noise level is relatively low. Therefore, the long exposure video signal has the first effective detection range 11.

The short exposure video signal 1070, as shown in FIG. 6B, a level of the short exposure video signal 1070 increases with the amount of received light up to the saturation level at with a low gamma γ. The short exposure video signal saturates with a relatively high amount of light because the exposure interval is relatively short. On the other hand, at the dark level range, the noise level is relatively high. Therefore, the short exposure video signal has the second effective detection range 12.

As shown in FIG. 6C, the long exposure video signal 1060 is combined with the short exposure video signal 1070 to provide an expanded detection range 13.

Figure 7C:
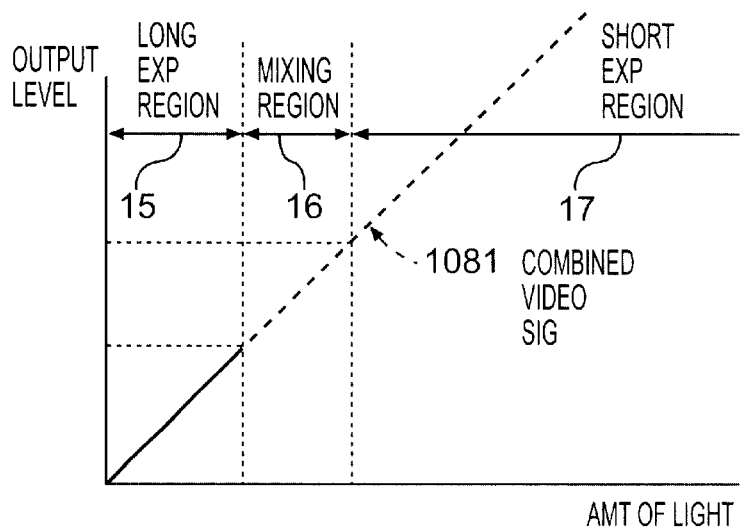

FIGS. 7A to 7C are graphical drawings of the first embodiment showing another example of the gain-adjusting and combining operations.

FIG. 7B shows the mixing control signal 1083. The mixing control signal 1082 represents the mixing ratio k=0 at the long exposure region 15, the mixing ratio k=1 at the short exposure region 17, and the mixing ratio proportionally increases from k=0 to k=1 at mixing region 16.

The long exposure video signal is modified by ratio (1−k) at the mixing region 16 and the short exposure video signal is modified by mixing ratio k at the mixing ratio 16 as shown in FIG. 7A. The combining circuit 1080 combines the short exposure video signal from the gain adjusting circuit 1150 with the short exposure video signal 1060 by adding the modified long exposure video signal to the short exposure video signal as shown in FIGS. 7A and 7C to provide the combined video signal with an expanded detection range 13 such that the first effective detection range 11 is connected to the second effective detection range 12.

In this embodiment the gain of the short exposure video signal is adjusted by the gain adjusting circuit 1150. However, it is also possible to adjust the gain of the long exposure video signal to match its gamma to that of the short exposure video signal.

SECOND EMBODIMENT

Figure 8:
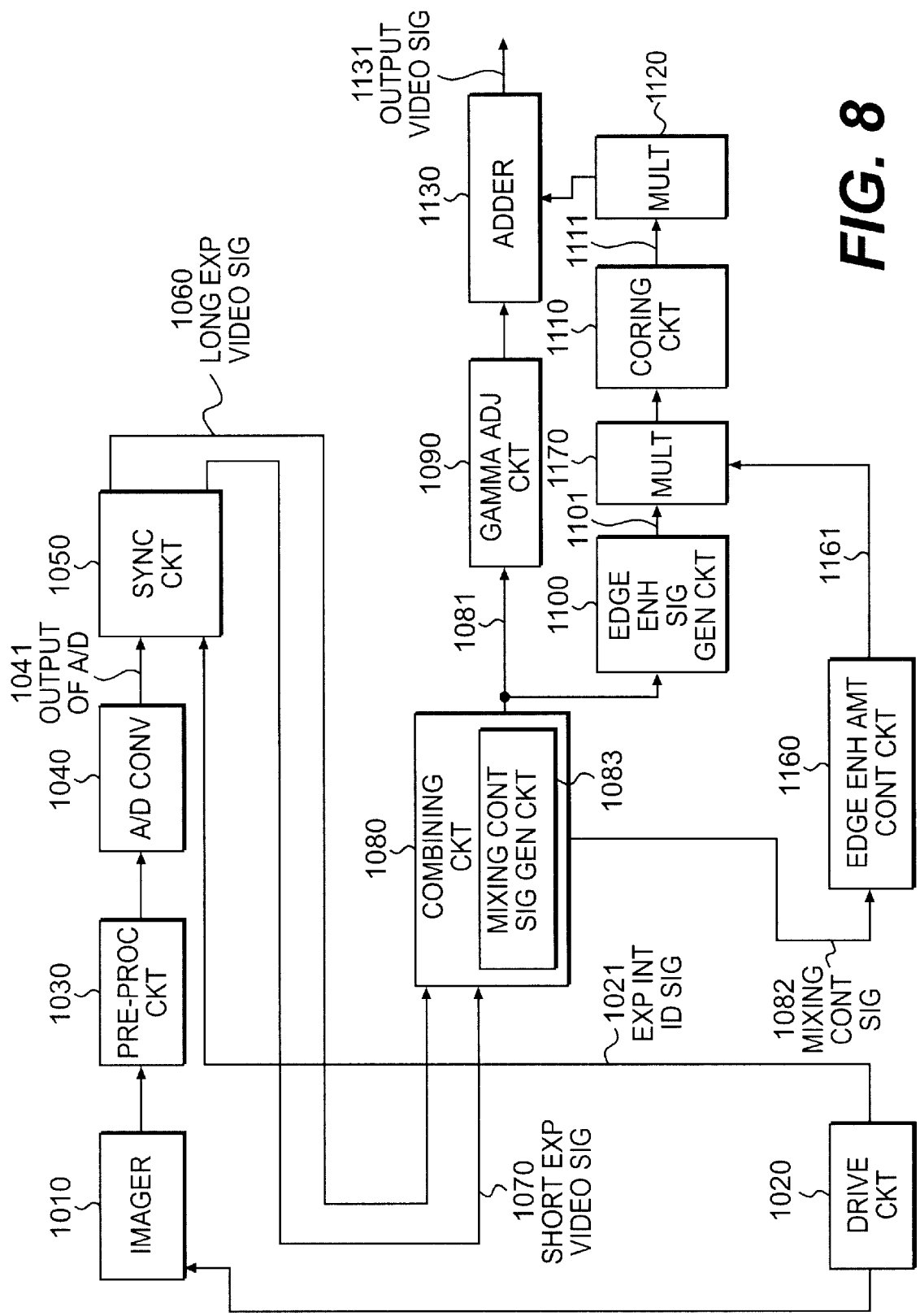
FIG. 8 is a block diagram of an imaging apparatus of a second embodiment.

FIG. 8 is a block diagram of an imaging apparatus of a second embodiment.

The imaging apparatus of the second embodiment has substantially the same structure as that of the first embodiment. The difference is that the gain adjustment circuit 1150 and the exposure ratio detection circuit 1140 are omitted and an edge enhancement amount control signal generation circuit 1160 and a multiplier 1170 are further provided.

Figure 9A:
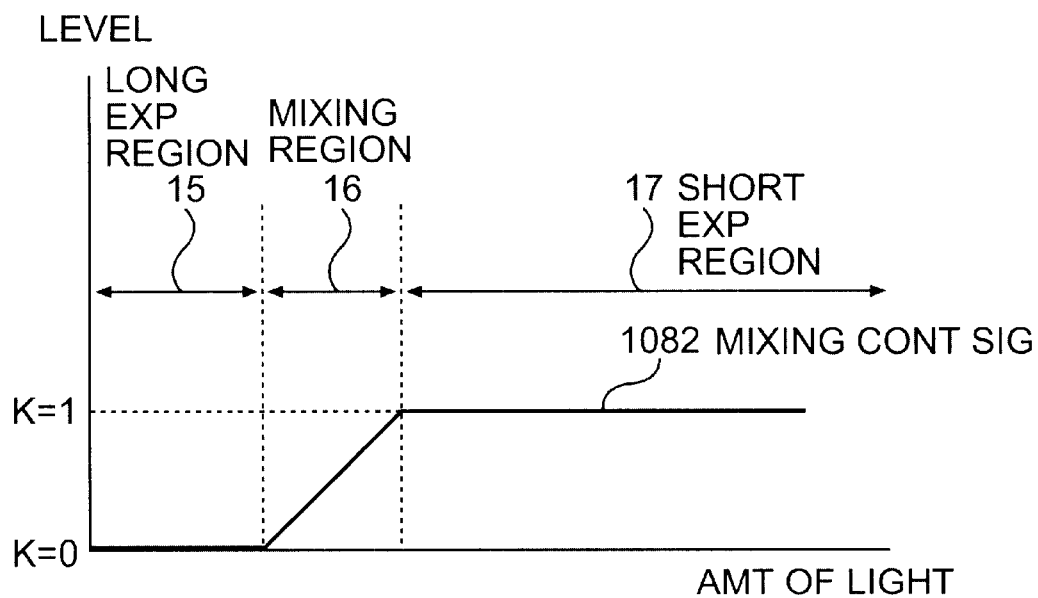
FIGS. 9A and 9B are graphical drawings of the second embodiment.
Figure 9B:
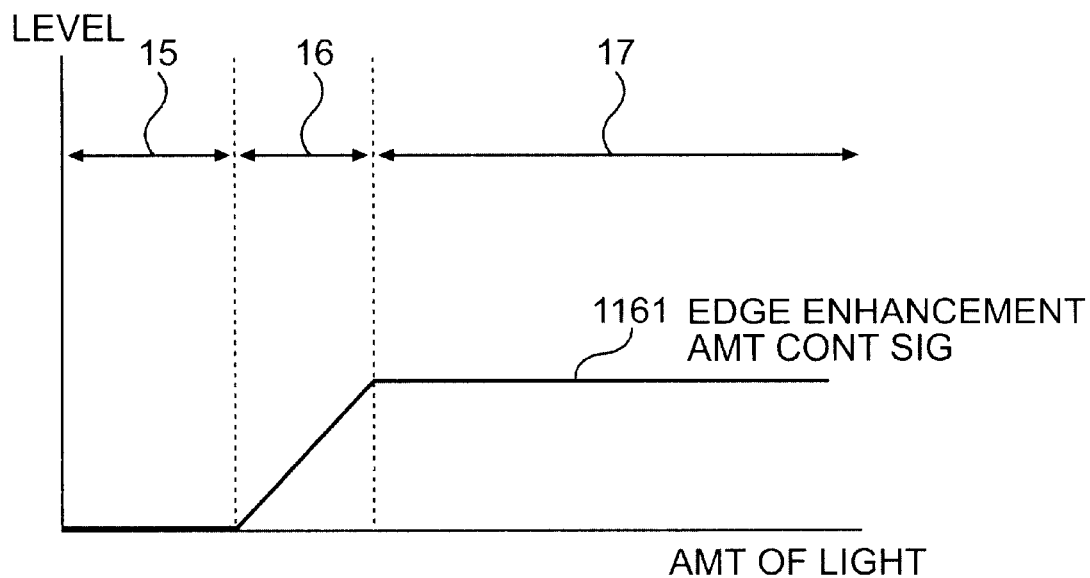

FIGS. 9A and 9B are graphical drawings of the second embodiment. FIG. 9A shows the mixing control signal which is also shown in FIG. 7A. FIG. 9B shows an edge enhancement amount control signal 1161.

The edge enhancement amount control circuit 1160 generates the edge enhancement amount control signal 1161 in accordance with the mixing control signal 1082 as shown in FIGS. 9A and 9B.

The multiplier 1170 controls the amount of the edge enhancement signal 1101 in accordance with the edge enhancement amount control signal 1161 and supplies the edge enhancement signal subjected to the edge enhancement amount controlling to the coring processing circuit 1110. The edge enhancement amount control signal 1161 at the long exposure region 15 indicates a coefficient of "1" for the multiplier 1170 and a coefficient of "2" at the short exposure region 17 for example. Therefore, the edge enhancement signal is controlled to have a larger edge enhancement signal at the short exposure ratio 17 by the multiplier 1170.

In this embodiment, the gain adjusting circuit 1150 and the exposure ratio detection circuit 1140 are omitted. However, it is also possible that these circuits are further provided to the imaging apparatus of the second embodiment as similar to the first embodiment.

THIRD EMBODIMENT

Figure 10:
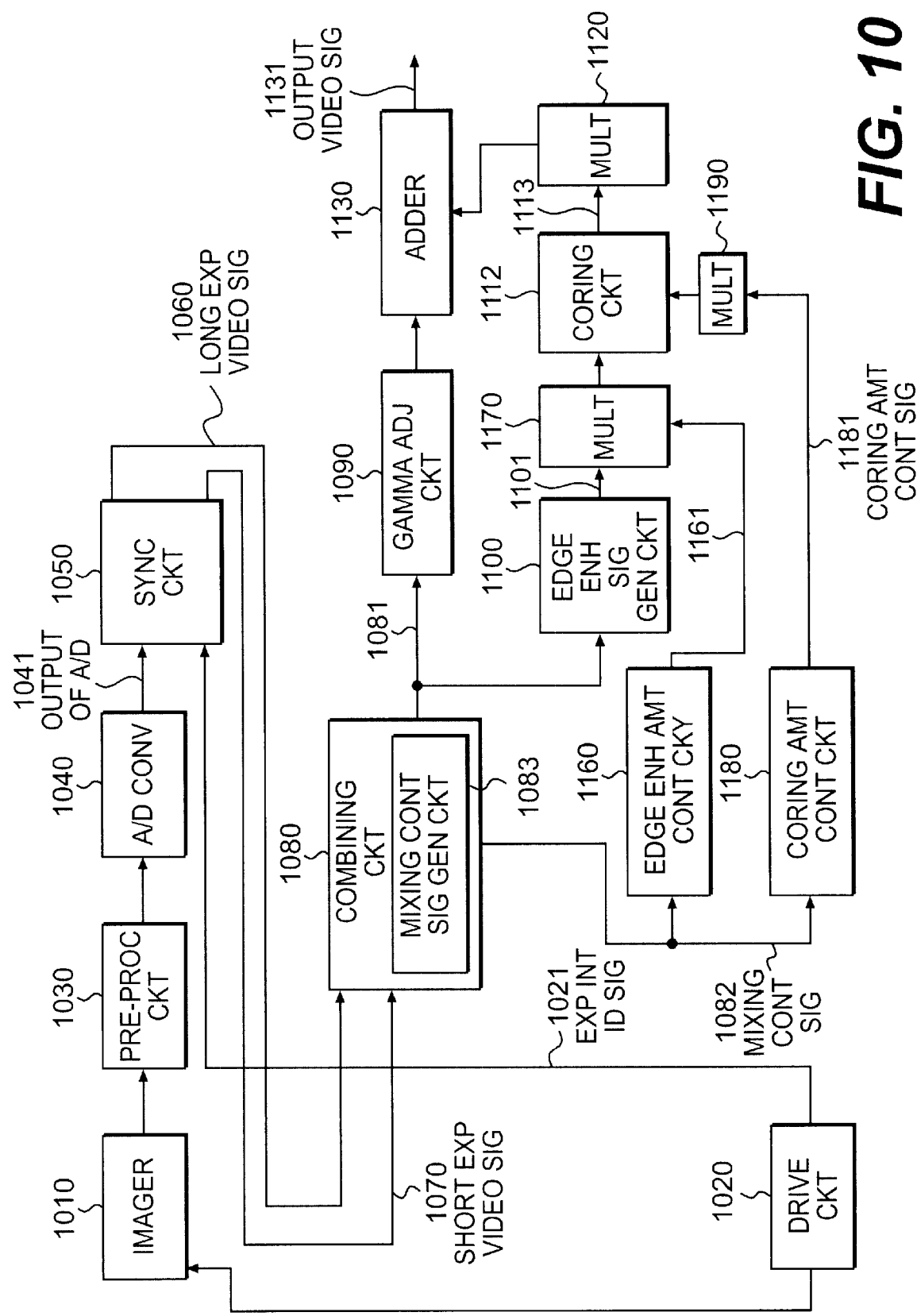
FIG. 10 is a block diagram of an imaging apparatus of a third embodiment.

FIG. 10 is a block diagram of an imaging apparatus of a third embodiment.

The imaging apparatus of the third embodiment has substantially the same structure as that of the second embodiment. The difference is that a coring amount control circuit 1180 and a multiplier 1190 are further provided and an amount of coring can be controlled, that is, a coring circuit 1112 is provided.

FIGS. 11A to 11D are graphical drawings of the third embodiment, wherein FIG. 11A shows the mixing control signal 1082 which is also shown in FIG. 7A.

The coring amount control circuit 1180 generates the coring amount control signal 1181 in accordance with the mixing control signal 1082.

The multiplier 1190 multiplies the coring amount control signal 1181 with a coefficient and supplies a final coring amount control signal to the coring circuit 1112. Therefore, noise components in the edge enhancement signal is controlled by the coring circuit 1112.

FIG. 11C shows the case that the coring amount is "1" and FIG. 11D shows the case that the coring amount is "1.5" Then, the noise components in the edge enhanced video signal at the short exposure region 17 which is conspicuous in the reproduced image is suppressed, so that the noise in the output video signal is improved.

In this embodiment, the gain adjusting circuit 1150 and the exposure ratio detection circuit 1140 are omitted. However, it is also possible that these circuits are further provided to the imaging apparatus of the third embodiment as similar to the first embodiment.

FOURTH EMBODIMENT

Figure 12:
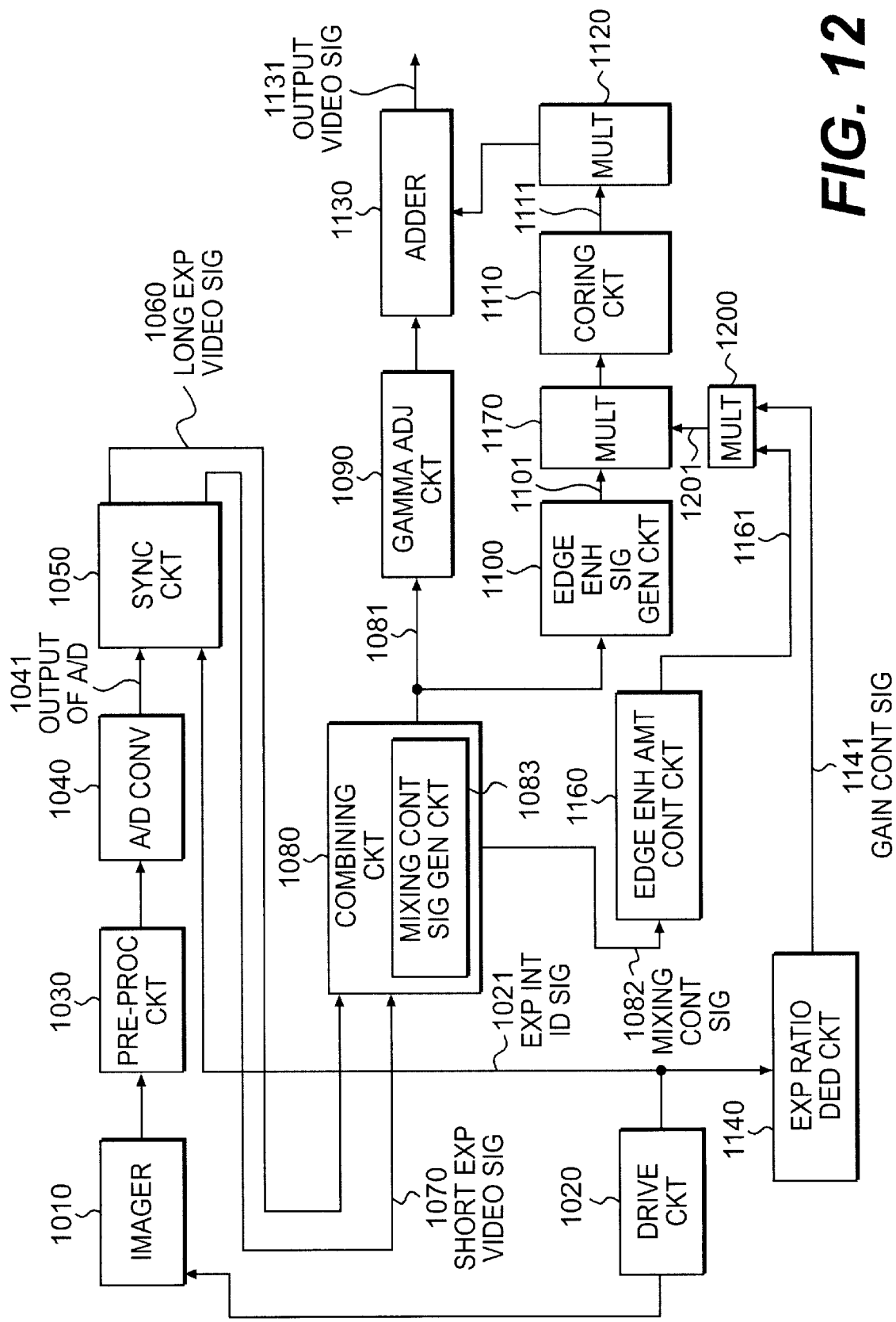
FIG. 12 is a block diagram of an imaging apparatus of a fourth embodiment.

FIG. 12 is a block diagram of an imaging apparatus of a fourth embodiment.

The imaging apparatus of the fourth embodiment has substantially the same structure as that of the second embodiment. The difference is that the exposure ratio detection circuit 1140 and a multiplier 1200 are further provided.

The multiplier 1200 controls the edge enhancement amount control signal 1161 in accordance with the gain control signal 1141 indicating the exposure ratio between the long exposure interval and the short exposure interval. The total amount of the edge enhancement signal is controlled, that is, weighted, by the multiplier 1170 in accordance with the edge enhancement amount control signal derived from the mixing control signal 1082 and the gain control signal 1141 derived from the exposure ratio. Then, the edges at the short exposure region which tends to be flat because of the short exposure can be enhanced further.

In this embodiment, the gain adjusting circuit 1150 is omitted. However, it is also possible that the gain adjusting circuit 1150 are further provided to the imaging apparatus of the fourth embodiment as similar to the first embodiment. Moreover, the edge enhancement amount control circuit 1160 can be omitted as the modification of this embodiment.

FIFTH EMBODIMENT

Figure 13:
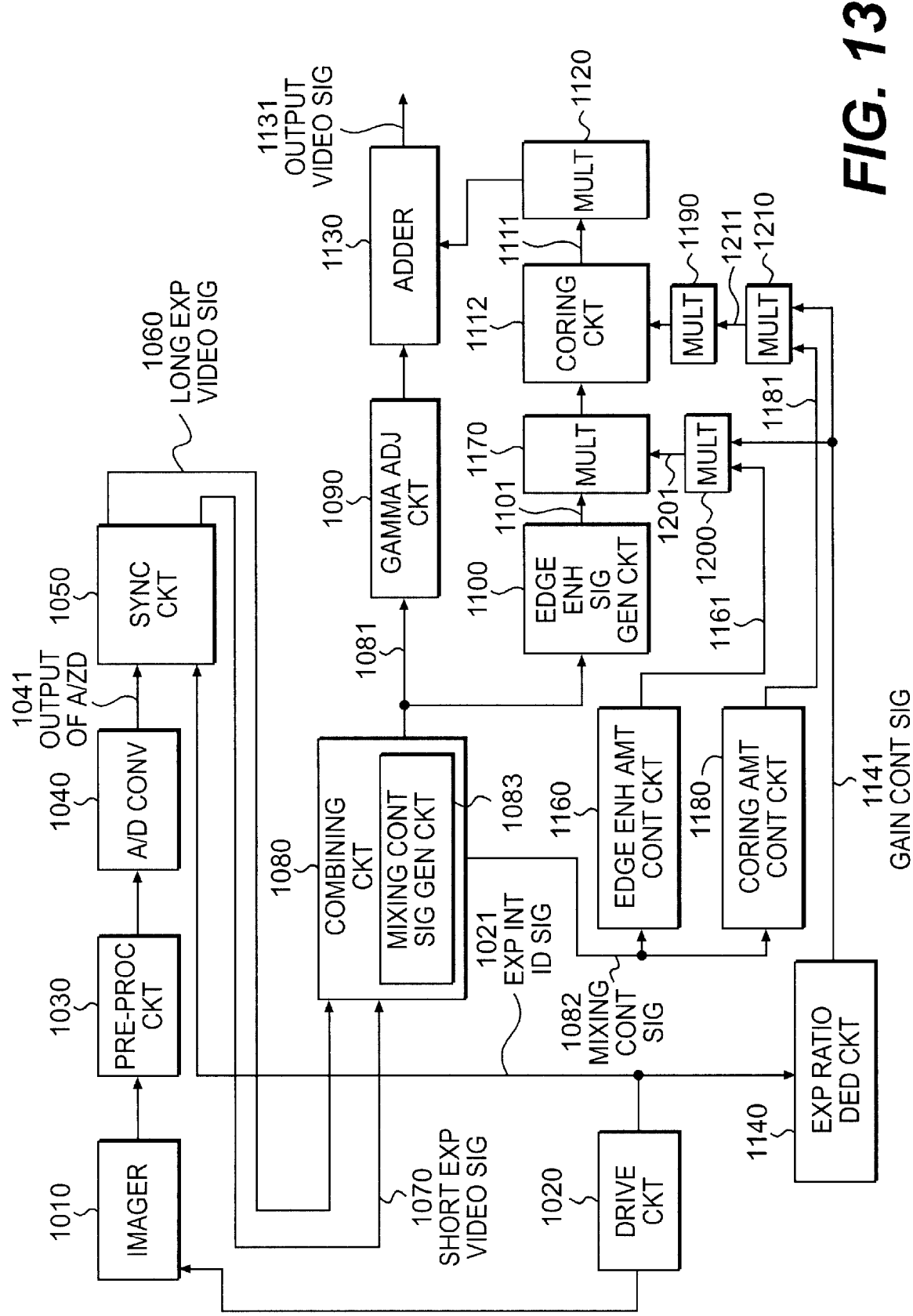
FIG. 13 is a block diagram of an imaging apparatus of a fifth embodiment.

FIG. 13 is a block diagram of an imaging apparatus of a fifth embodiment.

The imaging apparatus of the fifth embodiment has substantially the same structure as that of the fourth embodiment. The difference is that a multiplier 1210 and the coring amount control circuit 1180 and the multiplier 1190 which are used in the third embodiment are further provided.

The coring amount control circuit 1180 generates the coring amount controls signal 1181 in accordance with the mixing control signal 1082 as mentioned in the third embodiment. The multiplier 1210 controls the coring amount control signal 1181 in accordance with the gain control signal 1141 indicating the exposure ratio between the long exposure interval and the short exposure interval. The second coring amount control signal 1211 is controlled, that is, weighted, by the multiplier 1210 in accordance with the coring amount control signal 1181 derived from the mixing control signal 1082 and the gain control signal 1141 derived from the exposure ratio. Noise components in the edge enhancement signal from the multiplier 1170 Is suppressed by the coring circuit 1112.

Then, the edges at the short exposure region which tends to be flat because of the short exposure will be enhanced further and the noise component coring at the short exposure region which tends to be flat because of the short exposure can be enhanced further by providing the edge enhancement control circuit 1160. Moreover, the noise components in the edge enhanced video signal at the short exposure region 17 which is conspicuous in the reproduced image is suppressed, so that the noise in the output video signal is improved.

In this embodiment, the gain adjusting circuit 1150 is omitted. However, it is also possible that the gain adjusting circuit 1150 are further provided in the imaging apparatus of the fifth embodiment as similar to the first embodiment. Moreover, it is also possible as modifications of this embodiment that either of the edge enhancement amount control circuit 1160 and the multipliers 1170 and 1200 or the coring amount control circuit 1180 and the multipliers 1190 and 1210 are omitted.

SIXTH EMBODIMENT

Figure 14:
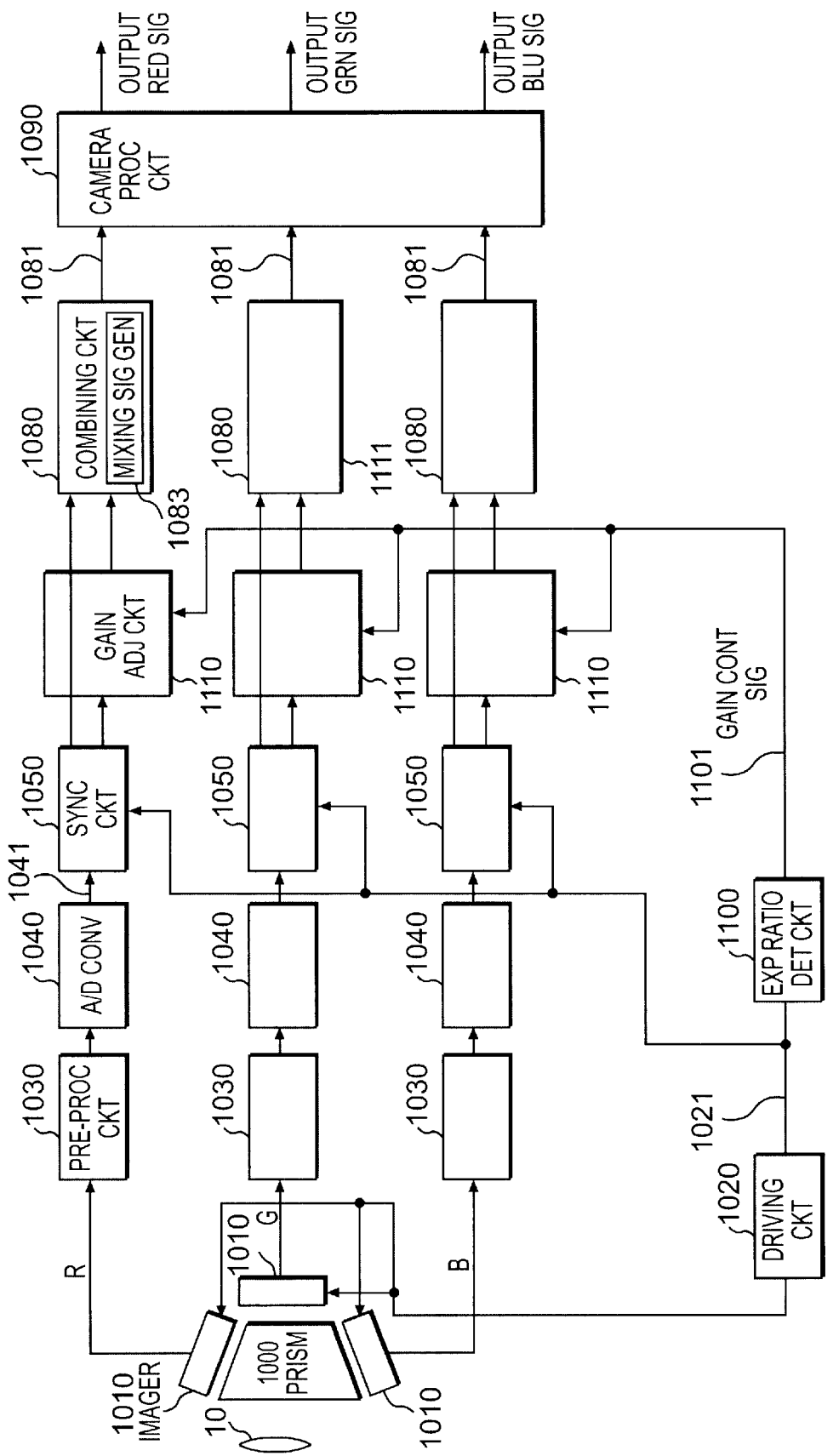
FIG. 14 is a block diagram of an imaging apparatus of a sixth embodiment.

FIG. 14 is a block diagram of an imaging apparatus of a sixth embodiment.

The imaging apparatus of the sixth embodiment has substantially the same structure as that of the first embodiment. The difference is that a prism unit 1000 for separating the incident image into color images, that is, a red image, a green image, and a blue image is further provided and the imagers 1010 respectively receives the red image, the green image, and a blue image, and the processing circuits, each including the pre-processing circuit 1030, the a/d converter 1040, the synchronizing circuit 1050, the gain adjusting circuit 1110, the combining circuit 1080, are provided for the red, green, and blue images respectively, and camera processing circuit 1090 for processing the respective color video signal is further provided. For color separation, dichroic mirror units may be used instead the prism unit 1000.

The imager 1010 of each color receives an optical image from the prism 1000 and generates a first video signal with a first exposure interval and a second video signal with a second exposure interval substantially at the same time, the second exposure interval being shorter than the first exposure interval, the first and second video signals respectively having first and second effective detection ranges 11 and 12. The synchronizing circuit 1050 for each color synchronizes the first video signal with the second video signal. The exposure interval ratio detection circuit 1100 responsive to the driving circuit 1020 detects an exposure ratio between the first and second exposure intervals. The gain adjusting circuit 1110 for each color adjusts the gain of the second video signal from the synchronizing circuit 1050 in accordance with the exposure ratio. The mixing control signal generation 1083 for each color generates a mixing control signal indicative of a mixing ratio of the first and second video signals. The combining circuit 1080 for each color generates a combined video signal from the first and second video signals in accordance with the mixing control signal and levels of the first and second video signals to have an expanded detection range such that the first effective detection range is connected to the second effective detection range as described in the first embodiment.

The camera processing circuit 1090 processes the combined video signals 1081 of red, green, and blue color to generates output red signal, an output green signal, and an output blue signal.

In this embodiment, the second to fifth embodiments are applicable to the imaging apparatus of the sixth embodiment.

SEVENTH EMBODIMENT

Figure 15:
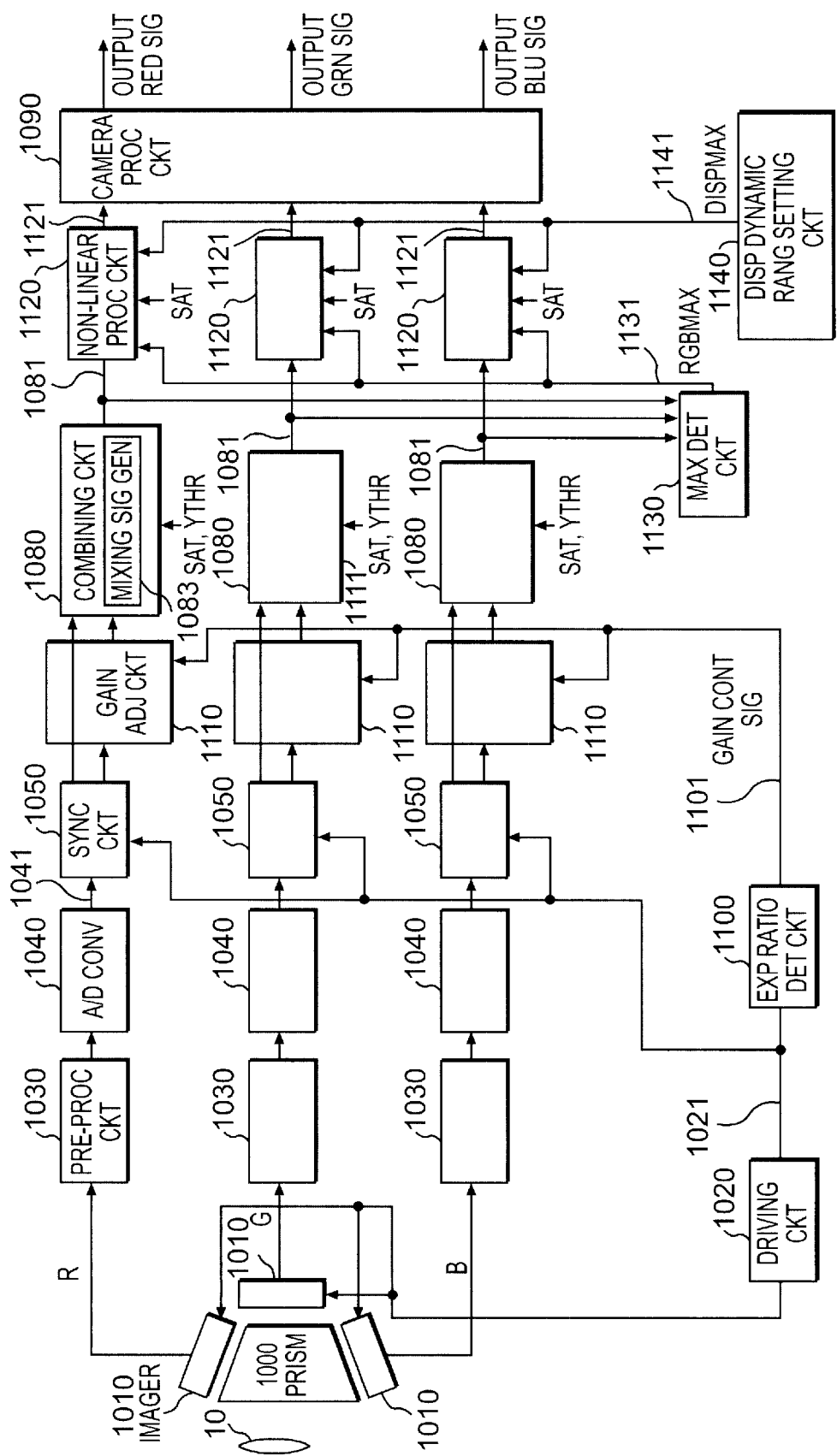
FIG. 15 is a block diagram of an imaging apparatus of a seventh embodiment.

FIG. 15 is a block diagram of an imaging apparatus of a seventh embodiment.

The imaging apparatus of the seventh embodiment has substantially the same structure as that of the sixth embodiment. The difference is that a max detection circuit 1130, non-linear processing circuits 1120, and a display dynamic range setting circuit 1140 are further provided.

The display dynamic setting circuit 1140 generates or receive and supplies data 1141 of display dynamic range (DISPMAX). The max detection circuit 1130 detects the maximum level among the third red, third green, and third blue video signals for one frame period. The non-linear processing circuits 1120 responsive to display dynamic range data (DISPMAX) 1141 generates and outputs red, green, and blue display signals having non-linear characteristics such that the maximum level is made equal to or less than the display dynamic range data when the detected maximum level is larger than the display dynamic range data and outputs the combined red, green, and blue video signal as they are when the detected maximum level is not larger than the display dynamic range data.

If the dynamic range of a display apparatus receiving the output red, blue, and green signals from this imaging apparatus is smaller than than the dynamic range of the output red, blue, and green signals, it is necessary to compress the dynamic range of the output the output red, blue, and green signals.

The non-linear processing circuit 1120 compress the dynamic range of the combined video signal to obtain a display video signal in accordance with the detected maximum (highest high light) level among the third red, third green and third blue video signals for one frame period, saturation data, and the display dynamic range setting data (DISPMAX) 1141 by internally dividing operation.

Figures 16, 17:
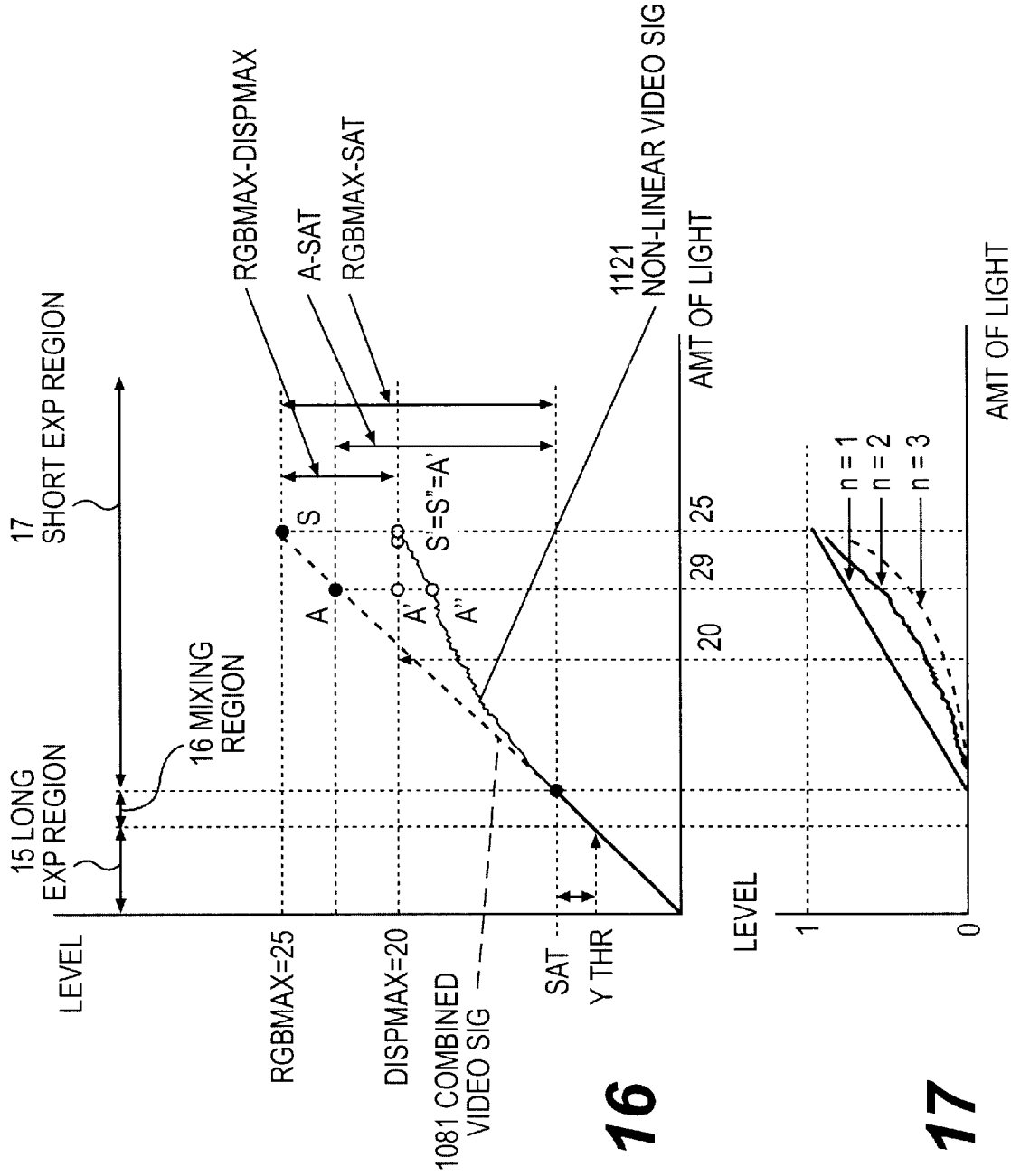
FIGS. 16 and 17 are graphical drawings of the seventh embodiment of this invention illustrating the dynamic range compression operation.

FIGS. 16 and 17 are graphical drawings of the seventh embodiment of this invention illustrating the dynamic range compression operation.

It is assumed that the display dynamic range (DISPMAX) 1141 is 20 and the maximum value (RGBMAX) is 25. The characteristic (gradation characteristic) curve of the combined video signals 1081 are bent above the saturation level (SAT). In fact, the level of the range-compressed video signal is provided by the internally dividing the level of the combined video signal using the maximum (RGBMAX), the saturation level (SAT), and the display dynamic range setting data (DISPMAX) 1141.

The maximum detection circuit 1130 detects a maximum level among the combined video signals 1081 of red, green, and blue for one frame and supplies the maximum level (RGBMAX) 1131 to the non-liner processing circuits 1120. The non-linear processing circuit 1120 generates the range-compressed video data in accordance with the detected maximum value, the saturation data, and the display range (DISPMAX) 1141.

As shown in FIG. 16, level A of the combined video signal is shifted to A" and level S is shifted to S" (=RGBMAX= DISPMAX) to prevent saturation. However, if level A is smaller than the saturation level (SAT), the non-linear processing is not executed, that is, A=A".

More specifically, if level A is more than the saturation level (SAT), assuming that n is a control efficient n for controlling the non-linear characteristic curve, the level A" after non-linear processing is given as follows:

When RGBMAX-DISPMAX$\geq$0 AND A$\geq$SAT, $\alpha$A=(A−SAT)/(RGBMAX−SAT)

A"=A−{($\alpha$A)$_n$×(RGBMAX−DISPMAX)}.

When RGBMAX−DISPMAX$\geq$0 AND A<SAT, $\alpha$A=0

A"=A

When RGBMAX−DISPMAX<0, $\alpha$A=0

A"=A

FIG. 17 shows the curves for providing the non-liner characteristic when the control coefficient n is varied from one to three.

Figure 18:
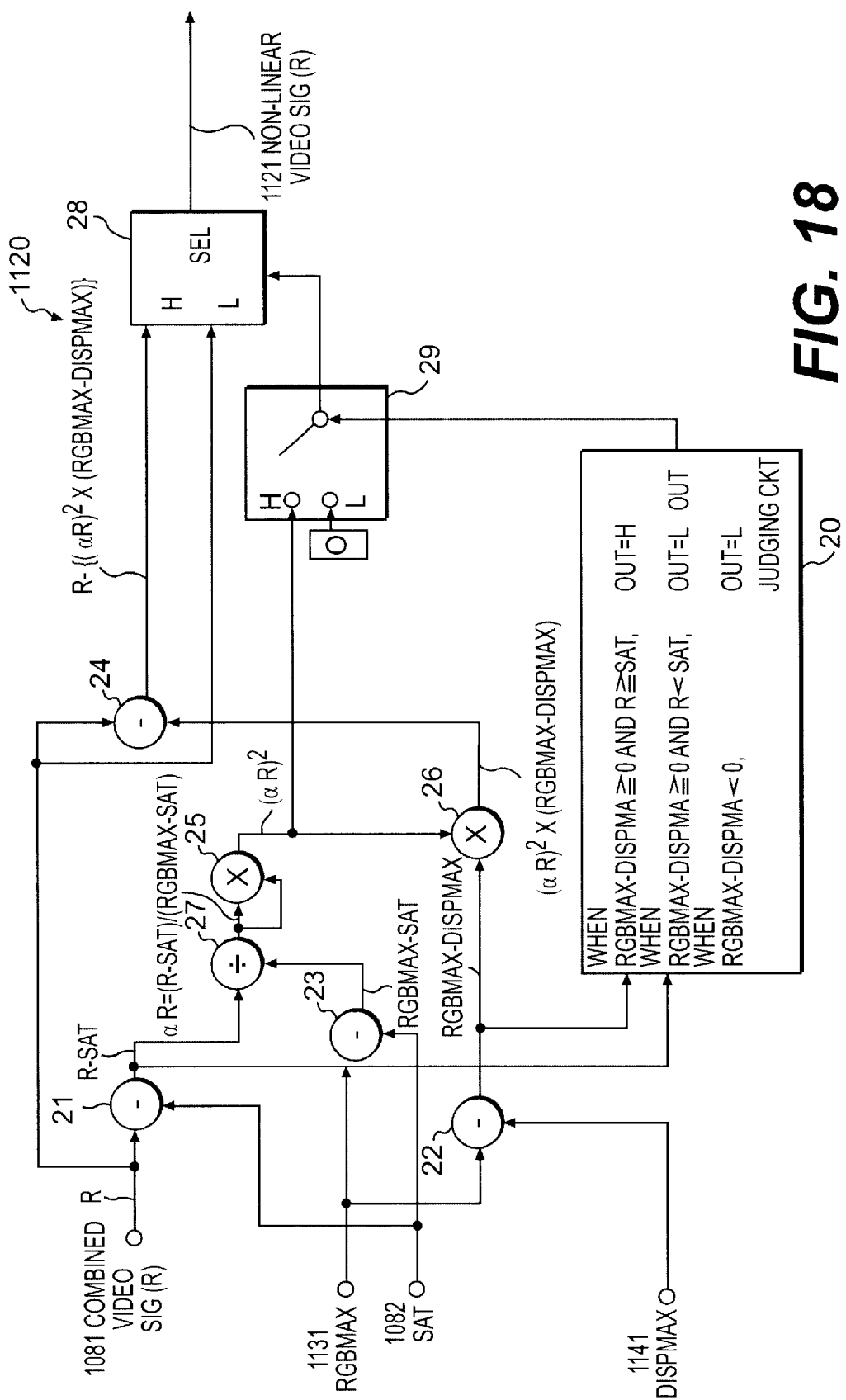
FIG. 18 is a block diagram of the non-linear processing circuit of the seventh embodiment.

FIG. 18 is a block diagram of the non-linear processing circuit 1120 of the seventh embodiment.

The non-liner processing circuit 1120 includes a judging circuit 20, subtractors 21 to 24, multipliers 25 and 26, a divider 27, switches 28 and 29 and generates a non-linear video signal 1121 in response to the combined video signal 1081, the maximum value 1131, the saturation data 1082, and a display maximum value 1141. The control efficient n for the non-liner characteristic is determined by the number of the multipliers 25 and connections around the multipliers 25.

The display dynamic range (DISPMAX) 1141 may be generated by a ROM or a RAM storing the display dynamic range (DISPMAX) 1141, manually set, or sent from the display apparatus to be connected. Moreover, the saturation value SAT can be decreased as desired by an operator.

Figure 19A:
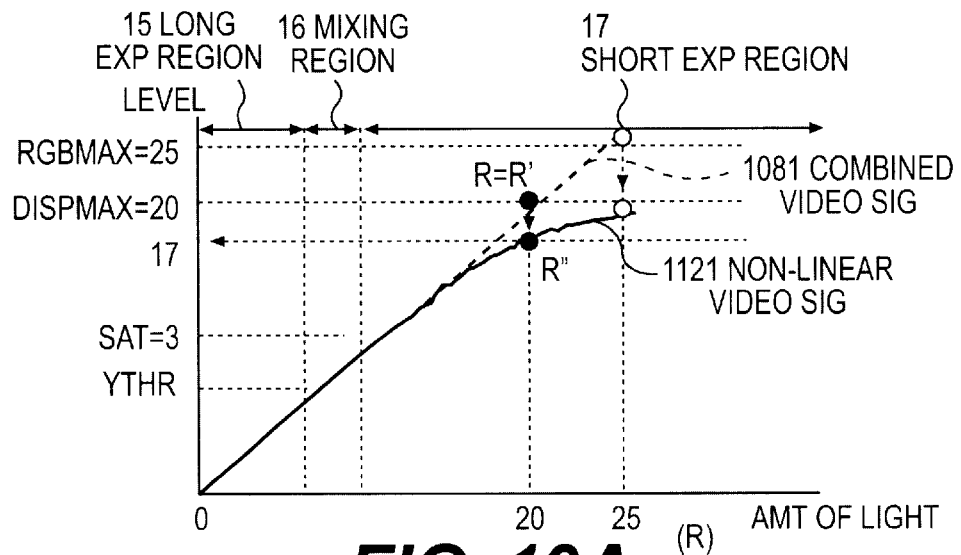
FIGS. 19A to 19C are graphical drawings of the seventh embodiment illustrating the non-linear processing.
Figure 19B:
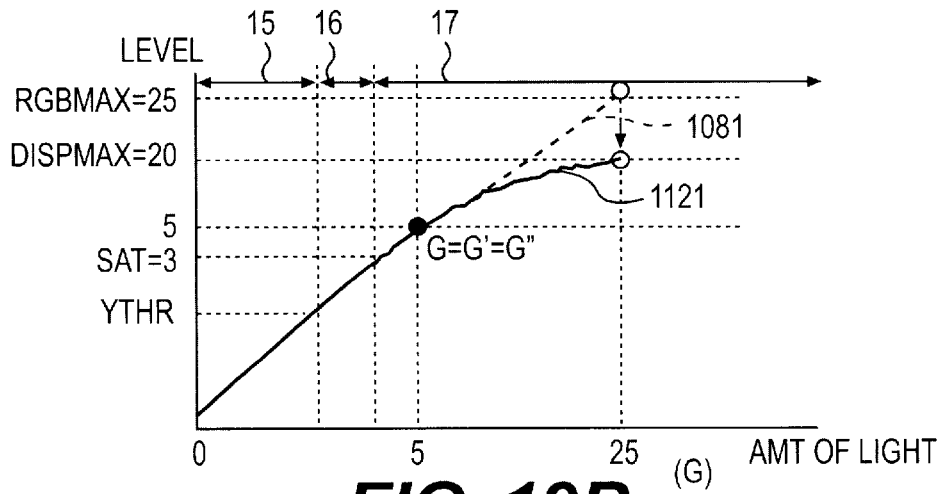
Figure 19C:
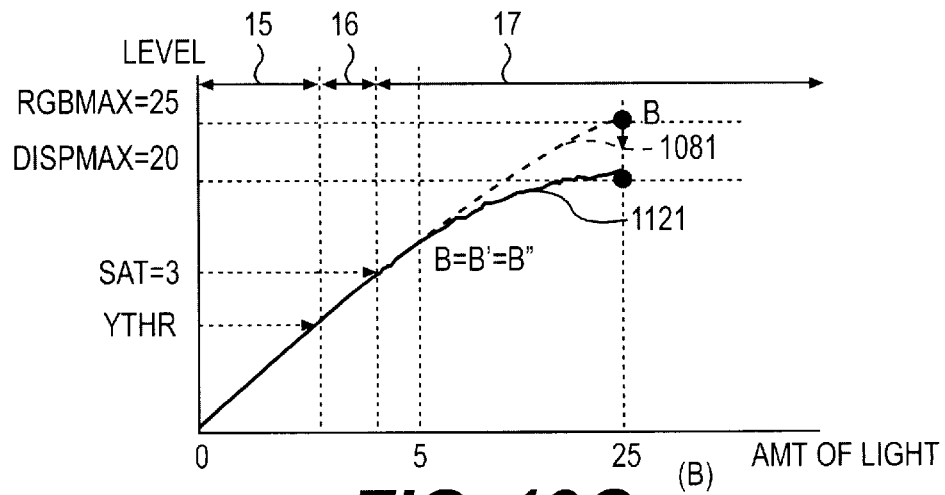

FIGS. 19A to 19C are graphical drawings of the seventh embodiment illustrating the non-linear processing.

It is assumed that the display dynamic range (DISPMAX) 1141=20, the maximum level among the red, green, and blue video signals (RGBMAX)=25, and the situation level (SAT) of the long exposure video signal=3 and that the red, green, and blue video signals respectively show levels R: G: B=20:5:25. The level of the red video signal is shifted from 20 to 17 by the non-linear processing, the level of the green video signal remains about 5 because the original level "5" is near the cut point "3" which is the saturation level, and the level of the blue video signal is shifted from 25 to 20 by the non-linear processing. Then, that is, the output levels of the non-linear circuits 1120 are R: G: B=17:5:20, so that saturation in the display apparatus to be connected to this imaging apparatus is prevented and the ratio of levels of the red, green, and blue video signals, that is, a tone of color, is substantially maintained.

The second to fifth embodiments are applicable to the imaging apparatus of the seventh embodiment.

What is claimed is:

1. An imaging apparatus comprising:

imaging means including driving means for receiving separated red, green, and blue optical images and generating first red, first green, and first blue video signals with a first exposure interval and second red, second green, and second blue video signals with a second exposure interval substantially at the same time, said second exposure interval being shorter than said first exposure interval, said first red, green, and blue video signals respectively having first red, first green, and first blue effective detection ranges and said second red, green, and blue video signals respectively having second red, second green, and second blue effective detection ranges which are different from said first red, first green, and first blue effective detection ranges respectively but continuous;

synchronizing means for synchronizing said first red, first green, and first blue video signals with second red, second green and second blue video signals every corresponding frame of said first red, first green, and first blue video signals and said second red, second green, and second blue video signals;

exposure interval ratio detection means responsive to said driving means for detecting an exposure ratio between said first and second exposure intervals;

gain adjusting means for respectively adjusting, through a mixing region, a difference between gains of said first red, first green, and first blue video signals and second red, second green and second blue video signals from said synchronizing means in accordance with said exposure ratio from said exposure interval ratio detection means;

mixing control signal generation means for generating red, green, and blue mixing control signals respectively indicating mixing ratios between said first red, first green, and first blue video signals and second red, second green, and second blue video signals in accordance with said first red, first green, and first blue video signals and second red, second green, and second blue video signals; and combining means for generating and outputting combined red, green, and blue video signals from said first red, first green, and first blue video signals and second red, second green, and second blue video signals from said gain adjusting means in accordance with said red, green, and blue mixing control signals and levels of said first red, first green, and first blue video signals and second red, second green, and second blue video signals to have expanded red, green, and blue detection ranges such that said first red, first green, and first blue effective detection ranges arc connected to said second red, second green, and second blue video signals, respectively.

2. The imaging apparatus as claimed in claim 1, further comprising:

maximum detection means for detecting a maximum level among said combined red, combined green, and combined blue video signals for one frame period; and non-linear processing means responsive to display dynamic range data for generating and outputting red, green, and blue display signals having non-linear characteristics over a saturation level such that said maximum level is made equal to or less than said display dynamic range data when the detected maximum level is larger than said display dynamic range data and outputting said combined red, green, and blue video signal as they are when the detected maximum level is not larger than said display dynamic range data.

3. A method of generating a combined video signal from an optical image comprising the steps of:

receiving separated red, green, and blue optical images;

generating first red, first green, and first blue video signals with a first exposure interval and second red, second green, and second blue video signals with a second exposure interval substantially at the same time, said second exposure interval being shorter than said first exposure interval, said first video signals respectively having first red, first green, and first blue effective detection ranges, said second video signals respectively having second red, second green, and second blue effective detection ranges which are respectively different from said first red, first green, and first blue effective detection ranges but continuous;

synchronizing said first red, first green, and first blue video signals with second red, second green, and second blue video signals every corresponding frames of said first red, first green, and first blue video signals and said second red, second green, and second blue video signals;

detecting an exposure ratio between said first and second exposure intervals;

adjusting through a mixing region a difference between gains of said first red, first green, and first blue video signals and second red, first, and video signals from said synchronizing means in accordance with said exposure ratio;

generating red, green, and blue mixing control signals respectively indicating mixing ratios between said first red, first green, and first blue video signals and second red, second green, and second blue video signals in accordance with said first red, first green, and first blue video signals and second red, second green, and second blue video signals; and generating and outputting combined red, green, and blue video signals from said first red, first green, and first blue video signals and second red, second green, and second blue video signals from said gain adjusting means in accordance with said mixing control signals and levels of said first red, first green, and first blue video signals and second red, second green, and second blue video signals to have expanded red, green, and blue detection ranges such that said first red, first green, and first blue effective detection ranges are connected to said second red, second green, and second blue video signals, respectively.

4. The method as claimed in claim 3, further comprising the steps of:

detecting a maximum level among said combined red, green, and blue video signals for one frame period; and generating and outputting red, green, and blue display signals having non-linear characteristics over a saturation level in accordance with display dynamic data and said maximum level such that said maximum level is made equal to or less than said display dynamic range data when the detected maximum level is larger than said display dynamic range data and outputting said combined red, green, and blue video signals as they are when the detected maximum level is not larger than said display dynamic range data.

5. A video camera comprising:

a lens unit:

separation means for separating an optical image beam into separated red, green, and blue optical images;

imaging means including driving means for receiving separated red, green, and blue optical images and generating first red, first green, and first blue video signals with a first exposure interval and second red, second green, and second blue video signals with a second exposure interval substantially at the same time, said second exposure interval being shorter than said first exposure interval, said first video signals respectively having first red, first green, and first blue effective detection ranges, said first and second video signals respectively having second red, second green, and second blue effective detection ranges which are different from said first red, first green, and first blue effective detection ranges but continuous;

synchronizing means for synchronizing said first red, first green, and first blue video signals with second red, second green, and second blue video signals every corresponding frame of said first red, first green, and first blue video signals and said second red, second green, and second blue video signals;

exposure interval ratio detection means responsive to said driving means for detecting an exposure ratio between said first and second exposure intervals;

gain adjusting means for adjusting through a mixing range a difference between gains of said first red, first green, and first blue video signals and second red, second green and second blue video signals from said synchronizing means in accordance with said exposure ratio from said exposure interval ratio detection means;

mixing control signal generation means for generating red, green, and blue mixing control signals respectively indicating mixing ratios between said first red, first green, and first blue video signals and second red, second green, and second blue video signals in accordance with said first red, first green, and first blue video signals and second red, second green, and second blue video signals; and combining means for generating and outputting combined red, green, and blue video signals from said first red, first green, and first blue video signals and second red, second green, and second blue video signals from said gain adjusting means in accordance with said mixing control signals and levels of said first red, first green, and first blue video signals and second red, second green, and second blue video signals to have expanded red, green, and blue detection ranges such that said first red, first green, and first blue effective detection ranges are connected to said second red, second green, and second blue video signals, respectively.

6. The camera as claimed in claim 5, further comprising:

maximum detection means for detecting a maximum level among said combined red, green, and blue video signals for one frame period; and non-linear processing means responsive to display dynamic range data for generating and outputting red, green, and blue display signals having non-linear characteristics over a saturation level such that said maximum level is made equal to or less than said display dynamic range data when the detected maximum level is larger than said display dynamic range data and outputting said combined red, green, and blue video signal as they are when the detected maximum level is not larger than said display dynamic range data.

* * * * *